US012487546B2

(12) United States Patent
Akizuki et al.

(10) Patent No.: US 12,487,546 B2
(45) Date of Patent: Dec. 2, 2025

(54) IMAGE FORMING APPARATUS

(71) Applicant: CANON KABUSHIKI KAISHA, Tokyo (JP)

(72) Inventors: Tomoo Akizuki, Kanagawa (JP); Yusuke Shimizu, Kanagawa (JP); Shunsuke Mizukoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/661,191

(22) Filed: May 10, 2024

(65) Prior Publication Data

US 2024/0377777 A1 Nov. 14, 2024

(30) Foreign Application Priority Data

May 12, 2023 (JP) ................................ 2023-079731

(51) Int. Cl.
*G03G 21/00* (2006.01)
*G03G 15/00* (2006.01)

(52) U.S. Cl.
CPC ..... *G03G 15/5004* (2013.01); *G03G 21/0005* (2013.01)

(58) Field of Classification Search
None
See application file for complete search history.

(56) References Cited

U.S. PATENT DOCUMENTS

2008/0152372 A1* 6/2008 Kimura ................ G03G 15/065 399/55
2014/0178086 A1* 6/2014 Kitamura ............. G03G 15/043 399/46
2018/0341192 A1* 11/2018 Kanazawa ......... G03G 15/0266
2019/0101859 A1* 4/2019 Minagawa ......... G03G 21/0005

(Continued)

FOREIGN PATENT DOCUMENTS

JP H07253693 A * 10/1995
JP 2001-22240 A 1/2001

(Continued)

OTHER PUBLICATIONS

Machine translations of Kiyosumi Tadahiro and Kobayashi K.*
U.S. Appl. No. 18/595,651, Yusuke Sakamoto Yusuke Shimizu Shunsuke Mizukoshi, filed Mar. 5, 2024.

*Primary Examiner* — Sevan A Aydin
(74) *Attorney, Agent, or Firm* — Venable LLP

(57) ABSTRACT

An image forming apparatus includes an image bearing member, a charging member, a charging voltage applying portion, an exposure unit, a developing member, a developing voltage applying portion, a cleaning member, and a controller. During a non-image forming operation from a start of rotation of the image bearing member to a start of an image forming operation or from an end of the image forming operation to a stop of the rotation of the image bearing member, in a contact rotation state of the developing member with the image bearing member, the controller effects control so as to execute a supplying operation in (Continued)

which Vback lower or higher than Vback during an image forming operation is generated in a time corresponding to one full rotation of the developing member and toner moved from the developing member to the surface of the image bearing member is supplied to the cleaning portion.

9 Claims, 26 Drawing Sheets

(56) References Cited

U.S. PATENT DOCUMENTS

| | | | | |
|---|---|---|---|---|
| 2020/0310275 | A1* | 10/2020 | Kanai | G03G 15/043 |
| 2023/0125722 | A1* | 4/2023 | Tokiwa | G03G 15/0266 399/168 |
| 2023/0195007 | A1* | 6/2023 | Hara | G03G 21/0035 |
| 2023/0288857 | A1* | 9/2023 | Akizuki | G03G 15/5033 |
| 2024/0168405 | A1 | 5/2024 | Shimizu et al. | |
| 2024/0288792 | A1* | 8/2024 | Mizukoshi | G03G 15/065 |
| 2025/0068092 | A1* | 2/2025 | Mizukoshi | G03G 15/0233 |

FOREIGN PATENT DOCUMENTS

| | | | | |
|---|---|---|---|---|
| JP | 2002-62724 | A | | 2/2002 |
| JP | 2002278231 | A | * | 9/2002 |
| JP | 2010197514 | A | * | 9/2010 |
| JP | 5335384 | B2 | | 11/2013 |
| JP | 2015052659 | A | * | 3/2015 |
| JP | 2017-194648 | A | | 10/2017 |
| JP | 2017227878 | A | * | 12/2017 |

* cited by examiner

| TIMING | EMB. 1 | | | EMB. 1 (MODIFIED EMB.) | | | EMB. 2 | | | EMB. 2 (MODIFIED EMB.) | | | COMP.EX. 1 | | |
|---|---|---|---|---|---|---|---|---|---|---|---|---|---|---|---|
| | DEV. VOL-TAGE | DRUM SURFACE POTENTIAL | Vback | DEV. VOL-TAGE | DRUM SURFACE POTENTIAL | Vback | DEV. VOL-TAGE | DRUM SURFACE POTENTIAL | Vback | DEV. VOL-TAGE | DRUM SURFACE POTENTIAL | Vback | DEV. VOL-TAGE | DRUM SURFACE POTENTIAL | Vback |
| PRE-RTTN | 150 | 0 | 150 | 150 | 0 | 150 | 150 | 0 | 150 | 150 | 0 | 150 | 150 | 0 | 150 |
| step1 | 90 | -50 | 140 | 100 | -40 | 140 | 140 | -50 | 190 | 100 | -90 | 190 | 100 | -50 | 150 |
| step2 | 30 | -100 | 130 | 50 | -80 | 130 | 130 | -100 | 230 | 50 | -180 | 230 | 50 | -100 | 150 |
| step3 | -30 | -150 | 120 | 0 | -120 | 120 | 120 | -150 | 270 | 0 | -270 | 270 | 0 | -150 | 150 |
| step4 | -90 | -200 | 110 | -50 | -160 | 110 | 110 | -200 | 310 | -50 | -360 | 310 | -50 | -200 | 150 |
| step5 | -150 | -250 | 100 | -100 | -200 | 100 | 100 | -250 | 350 | -100 | -450 | 350 | -100 | -250 | 150 |
| step6 | -210 | -300 | 90 | -150 | -240 | 90 | 10 | -300 | 310 | -150 | -460 | 310 | -150 | -300 | 150 |
| step7 | -270 | -350 | 80 | -200 | -280 | 80 | -80 | -350 | 270 | -200 | -470 | 270 | -200 | -350 | 150 |
| step8 | -330 | -400 | 70 | -250 | -320 | 70 | -170 | -400 | 230 | -250 | -480 | 230 | -250 | -400 | 150 |
| step9 | -350 | -450 | 100 | -300 | -400 | 100 | -260 | -450 | 190 | -300 | -490 | 190 | -300 | -450 | 150 |
| step10 | -350 | -500 | 150 | -350 | -500 | 150 | -350 | -500 | 150 | -350 | -500 | 150 | -350 | -500 | 150 |
| POST-RTTN | -350 | -500 | 150 | -350 | -500 | 150 | -350 | -500 | 150 | -350 | -500 | 150 | -350 | -500 | 150 |
| step11 | -310 | -450 | 140 | -300 | -440 | 140 | -270 | -450 | 180 | -300 | -480 | 180 | -300 | -450 | 150 |
| step12 | -270 | -400 | 130 | -250 | -380 | 130 | -190 | -400 | 210 | -250 | -460 | 210 | -250 | -400 | 150 |
| step13 | -230 | -350 | 120 | -200 | -320 | 120 | -110 | -350 | 240 | -200 | -440 | 240 | -200 | -350 | 150 |
| step14 | -190 | -300 | 110 | -150 | -260 | 110 | -30 | -300 | 270 | -150 | -420 | 270 | -150 | -300 | 150 |
| step15 | -150 | -250 | 100 | -100 | -200 | 100 | 50 | -250 | 300 | -100 | -400 | 300 | -100 | -250 | 150 |
| step16 | -110 | -200 | 90 | -50 | -140 | 90 | 130 | -200 | 330 | -50 | -380 | 330 | -50 | -200 | 150 |
| step17 | -70 | -150 | 80 | 0 | -80 | 80 | 150 | -150 | 300 | 0 | -300 | 300 | 0 | -150 | 150 |
| step18 | -30 | -100 | 70 | 50 | -20 | 70 | 150 | -100 | 250 | 50 | -200 | 250 | 50 | -100 | 150 |
| step19 | 30 | -50 | 80 | 100 | -20 | 120 | 150 | -50 | 200 | 100 | -100 | 200 | 100 | -50 | 150 |
| step20 | 90 | 0 | 90 | 150 | 0 | 150 | 150 | 0 | 150 | 150 | 0 | 150 | 150 | 0 | 150 |
| step21 | 150 | 0 | 150 | 150 | 0 | 150 | 150 | 0 | 150 | 150 | 0 | 150 | 150 | 0 | 150 |

FIG. 24

IMAGE FORMING APPARATUS

FIELD OF THE INVENTION AND RELATED ART

The present invention relates to an image forming apparatus, such as a printer, a copying machine, or a facsimile apparatus, of an electrophotographic type.

In the image forming apparatus of the electrophotographic type, a surface of a photosensitive member as an image bearing member is electrically charged uniformly by a charging member, and is exposed to light by an exposure device, so that an electrostatic latent image is formed on the photosensitive member. This electrostatic latent image is developed by being supplied with toner as a developer by a developing device, so that a toner image is formed on the photosensitive member. Then, this toner image is transferred onto a recording material. As the photosensitive member, a rotatable photosensitive drum is used in many cases.

In such an image forming apparatus as a type in which transfer residual toner, untransferred toner in the case where a jam (clogging of a recording material) occurs, or the like is removed from the surface of the photosensitive member, there is a type in which the toner is physically scraped off by a cleaning member provided in contact with the surface of the photosensitive member. As the cleaning member, a cleaning blade is used in many cases. The cleaning blade has a predetermined length in each of a longitudinal direction and a widthwise direction substantially perpendicular to the longitudinal direction and is constituted by including a plate-like rubber portion which has a predetermined thickness and which is formed with an elastic material such as urethane rubber.

The rubber portion of the cleaning blade is disposed so that the longitudinal direction thereof extends along a direction substantially perpendicular to a movement direction of the surface of the photosensitive member. Further, the rubber portion of the cleaning blade is contacted to the surface of the photosensitive member in a counter direction to a rotational direction of the photosensitive member so that a free end portion thereof with respect to the widthwise direction is directed toward an upstream side of the movement direction of the surface of the photosensitive member.

In the image forming apparatus using the cleaning blade, when the photosensitive member is continuously rotated in a state in which an amount of the toner supplied to the photosensitive member is small, a frictional force between the photosensitive member and the cleaning blade increases. By this, the cleaning blade causes shuddering (vibration) in some instances. The shuddering of the cleaning blade causes improper cleaning (defective cleaning). The improper cleaning is a phenomenon that the toner is not scraped off by the cleaning blade, and slips through the cleaning blade (hereinafter, simply referred also to as "slip-through"). As a situation in which the photosensitive member rotates in a state that the amount of the toner supplied to the photosensitive member is small, the case where print (printing) of an image with a low print ratio continues, the case where a preparatory rotation (a pre-rotation step and a post-rotation step before and after an image forming step) is performed, and the like case can be cited.

On the other hand, there is a method in which the shuddering of the cleaning blade is suppressed by performing a "supplying operation" for supplying toner to a contact portion between the photosensitive member and the cleaning blade during non-image formation and thus by reducing a frictional force by a lubricating effect with the toner or an external additive. Japanese Patent No. 5335384 discloses that depending on an environment and a print ratio, a supply amount of the toner in the supplying operation and a frequency of execution of the supplying operation are controlled. Conventionally, in the supplying operation, a predetermined toner pattern (solid black image or a thin line image) is formed on the photosensitive member, and toner of this toner pattern is supplied to the contact portion between the photosensitive member and the cleaning blade.

However, when the predetermined toner pattern (the solid black image or the thin line image) is formed on the photosensitive member in the supplying operation as described above, the improper cleaning occurs due to slip-through of the toner itself of the toner pattern in some instances. The toner constituting the toner pattern has a sufficient electric charge in many cases, and one of causes the improper cleaning is such that the toner is not readily scraped off by the cleaning blade due to a high mirror force of the toner with the photosensitive member.

SUMMARY OF THE INVENTION

A principal object of the present invention is to provide an image forming apparatus capable of suppressing an occurrence of improper cleaning by supplying toner to a contact portion between an image bearing member and a cleaning member during non-image formation and thus by reducing a frictional force between the image bearing member and the cleaning blade.

This object is accomplished by an image forming apparatus according to the present invention.

According to an aspect of the present invention, there is provided an image forming apparatus comprising: a rotatable image bearing member; a charging member configured to electrically charge a surface of the image bearing member; a charging voltage applying portion configured to apply a charging voltage to the charging member; an exposure unit configured to form an electrostatic latent image on the surface of the image bearing member by exposing, to light, the surface of the image bearing member charged by the charging member; a developing member rotatable while carrying toner, forming a developing portion in contact with the surface of the image bearing member and configured to form a toner image on the surface of the image bearing member by supplying the toner to the electrostatic latent image on the surface of the image bearing member at the developing portion; a developing voltage applying portion configured to apply a developing voltage to the developing member; a cleaning member forming a cleaning portion in contact with the surface of the image bearing member and configured to remove the toner from the surface of the image bearing member; and a controller configured to control at least one of the charging voltage applying portion, the developing voltage applying portion, and the exposure unit so as to generate a Vback which is a potential difference between a surface potential of the image bearing member charged by the charging member and the developing voltage applied to the developing member at the developing portion and which is the potential difference such that the surface potential is higher than the developing voltage on a side where a polarity thereof is the same as a normal charge polarity of the toner, wherein the controller carries out control so as to execute an image forming operation for forming the toner image on the surface of the image bearing member and a non-image forming operation for not forming the toner image on the surface of the image bearing member, and wherein during the non-image forming operation from a start of rotation of the image bearing member to a start of the image forming operation or the non-image forming operation from an end of the image forming operation to a stop of the rotation of the image bearing member, in a state in which the developing member rotates in contact with the image bearing member, the controller carries out control so as to execute a supplying operation in which a Vback smaller or larger than the Vback during the image forming operation is formed in a time corresponding to one full rotation of the developing member and the toner moved from the developing member to the surface of the image bearing member is supplied to the cleaning portion.

Further features of the present invention will become apparent from the following description of exemplary embodiments with reference to the attached drawings.

BRIEF DESCRIPTION OF THE DRAWINGS

FIG. 24 is a table showing developing voltages and surface potentials of photosensitive drums in pre-rotation sequences and post-rotation sequences in modified embodiments of the embodiments 1 and 2.

DESCRIPTION OF THE EMBODIMENTS

In the following, an image forming apparatus according to the present invention will be described specifically with reference to the drawings. However, materials, shapes, a relative arrangement, and the like of constituent parts described in the following embodiments should be appropriately changed depending on constitutions and various conditions of apparatuses (devices) to which the present invention is applied, and a scope of the present invention is not intended to be limited to the following embodiments.

1. General Structure and Operation of Image Forming Apparatus

Figure 1:
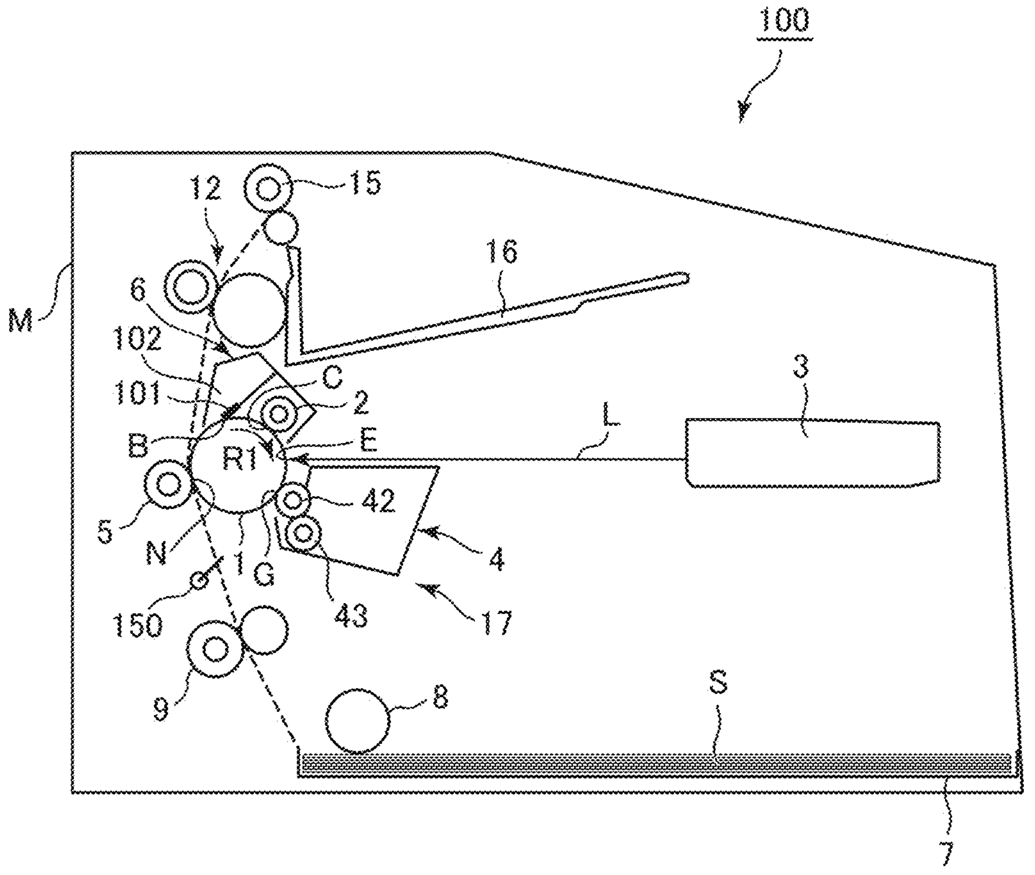
FIG. 1 is a schematic sectional view of an image forming apparatus.

FIG. 1 is a schematic sectional view of an image forming apparatus 100 of an embodiment (embodiment 1). The image forming apparatus 100 of this embodiment is a monochromatic laser printer capable of forming a black (monochromatic) image on a sheet-like recording material S as a toner image-receiving member by using an electrophotographic type system.

The image forming apparatus 100 includes a photosensitive drum 1 which is a rotatable drum-shaped (cylindrical) photosensitive member as an image bearing member. When a print signal is inputted to the image forming apparatus 100, the photosensitive drum 1 is rotationally driven at a predetermined peripheral speed in an arrow R1 direction (clockwise direction) in FIG. 1 by a main motor 10 (FIG. 2) as a driving source constituting a driving means. In this embodiment, a process speed of the image forming apparatus 100 corresponding to the peripheral speed of the photosensitive drum 1 is 250 mm/s.

At a periphery of the photosensitive drum 1, along a rotational direction of the photosensitive drum 1, a charging roller 2, an exposure device 3, a developing device 4, a transfer roller 5, and a cleaning device 6 are sequentially provided in a named order. Further, at a lower portion of the image forming apparatus 100, a cassette 7 in which recording materials S are accommodated is provided, and along a conveying passage of the recording material S from the cassette 7, a feeding roller 8, a conveying roller 9, a Top sensor 150, a fixing device 12, a discharging roller 15, and a discharging tray 16 are provided in a named order.

A surface of a rotating photosensitive drum 1 is electrically charged uniformly to a predetermined polarity (negative polarity in this embodiment) and a predetermined potential by the charging roller 2 which is a roller-type charging member as a charging means. The charging roller 2 constitutes a charging device as the charging means. The charging roller 2 forms a charging portion (charging nip) C in contact with the photosensitive drum 1. During the charging, to the charging roller 2, a predetermined charging voltage (charging bias) which is a DC voltage of the same polarity (negative polarity in this embodiment) as a charge polarity of the photosensitive drum 1 is applied by a charging power source (high-voltage power source) 11 (FIG. 2) as a charging voltage applying means (charging voltage applying portion). The charged surface of the photosensitive drum 1 is subjected to scanning exposure by an exposure device 3 as an exposure means depending on an image signal (image information) inputted to the image forming apparatus 100, so that an electrostatic latent image (electrostatic image) is formed on the photosensitive drum 1. The exposure device will be further described specifically later. The electrostatic latent image formed on the photosensitive drum 1 is developed (visualized) by being supplied with toner as a developer by a developing device 4 as a developing means, so that a toner image (developer image) is formed on the photosensitive drum 1. A developing roller 42 provided in the developing device 4 forms a developing portion (developing nip) G in contact with the photosensitive drum 1. The developing device 4 will be further described specifically later.

A transfer roller 5 which is a roller-type transfer member as a transfer means is provided opposed to the photosensitive drum 1. The transfer roller 4 constitutes a transfer device as the transfer means. The transfer roller 5 is pressed toward the photosensitive drum 1 and forms a transfer portion (transfer nip) N where the photosensitive drum 1 and the transfer roller 5 are in contact with each other. In the transfer portion N, the toner image formed on the photosensitive drum 1 is transferred onto a recording material S nipped and conveyed by the photosensitive drum 1 and the transfer roller 5. During the transfer, to the transfer roller 5, a predetermined transfer voltage (transfer bias) which is a DC voltage of an opposite polarity (positive polarity in this embodiment) to a normal charge polarity (normal polarity) of the toner is applied by a transfer power source (high-voltage power source) 14 (FIG. 2) as a transfer voltage applying means (transfer voltage applying portion).

The recording material (recording medium, transfer material, sheet) S such as paper is accommodated in the cassette 7 as a recording material accommodating portion. The recording materials S accommodated in the cassette 7 are separated and fed one by one from the cassette 7 by the feeding roller 8 as a feeding member and are conveyed toward the conveying roller 9. Each recording material S is supplied to the transfer portion N by the conveying roller (registration roller) 9 as a conveying member, so as to be timed to the toner image on the photosensitive drum 1. With respect to a conveying direction of the recording material S, between the conveying roller 9 and the transfer portion N, as a recording material detecting means for detecting the recording material S, the Top sensor 150 for detecting a leading end of the recording material S with respect to the conveying direction is provided. A signal indicating a detection result of the top sensor 150 is inputted to an engine controller 205 (FIG. 2) (described later), and is used for control of an image writing timing by the exposure device 3, or the like.

The recording material S on which the toner image is transferred is conveyed to the fixing device 12 as a fixing means. The fixing device 12 fixes (melts, sticks) the toner image on the recording material S by heating and pressing the recording material S on which an unfixed toner image is carried. The recording material S on which the toner image is fixed is discharged (outputted) onto the discharging tray 16 as a discharge portion provided outside the apparatus main assembly M, by the discharging roller 15 as a conveying member.

The toner (transfer residual toner) remaining on the photosensitive drum 1 after the transfer of the toner image onto the recording material S is removed and collected from the surface of the photosensitive drum 1 by the cleaning device 6 as a cleaning means. The cleaning device 6 includes a cleaning blade 101 as a cleaning member provided so as to contact the surface of the photosensitive drum 1 and includes a cleaning container 102. The cleaning blade 101 contacts the photosensitive drum 1 and forms a cleaning portion (cleaning nip) B. Further, the cleaning device 6 scrapes off the transfer residual toner from the surface of the rotating photosensitive drum 1 and collects the transfer residual toner in the cleaning container 102.

Here, with respect to a rotational direction of the photosensitive drum 1, a position on the photosensitive drum 1 where the charging roller 2 charges the photosensitive drum 1 is a charging portion (charging position) C. The charging roller 2 charges the photosensitive drum 1 by electric discharge generating in at least one of minute gaps between the photosensitive drum 1 and the charging roller 2 on sides upstream and downstream of a contact portion between the photosensitive drum 1 and the charging roller 2 with respect to the rotational direction of the photosensitive drum 1. However, for simplification, herein, description will be made by regarding the contact portion on the photosensitive drum 1 with the charging roller 2 as the charging portion (charging position) C. Further, with respect to the rotational direction of the photosensitive drum 1, a position on the photosensitive drum 1 irradiated with laser light by the exposure device 3 is an exposure portion (exposure position) E. Further, with respect to the rotational direction of the photosensitive drum 1, a position on the photosensitive drum 1 (a contact portion on the photosensitive drum 1 with the developing roller 42 in this embodiment) where the toner is supplied by the developing roller 42 is a developing portion (developing position) G. Further, with respect to the rotational direction of the photosensitive drum 1, a position on the photosensitive drum 1 (a contact portion on the photosensitive drum 1 with the transfer roller 5 in this embodiment) where the toner image is transferred onto the recording material S is a transfer portion (transfer position) N. Further, with respect to the rotational direction of the photosensitive drum 1, a position on the photosensitive drum 1 (a contact portion on the photosensitive drum 1 with the cleaning blade 101 in this embodiment) where the toner is removed by the cleaning blade 101 is a cleaning portion (cleaning position) B. Incidentally, each of the positions of the charging portion C, the developing portion G, and the transfer portion N is represented by a center position with respect to the rotational direction of the photosensitive drum 1. In this embodiment, the image forming apparatus 100 does not include a discharging device (pre-exposure device or the like) for discharging the surface of the photosensitive drum 1 on a side downstream of the transfer portion N and upstream of the charging portion C with respect to the rotational direction of the photosensitive drum 1.

Further, in this embodiment, the photosensitive drum 1, and as process means, the charging roller 2, the developing device 4, and the cleaning device 6 are integrally assembled into a cartridge and constitute a process cartridge 17 detachably mountable to the apparatus main assembly M. Incidentally, the apparatus main assembly M of the image forming apparatus 100 is a portion such that the process cartridge 17 is removed from the image forming apparatus 100.

Figure 2:
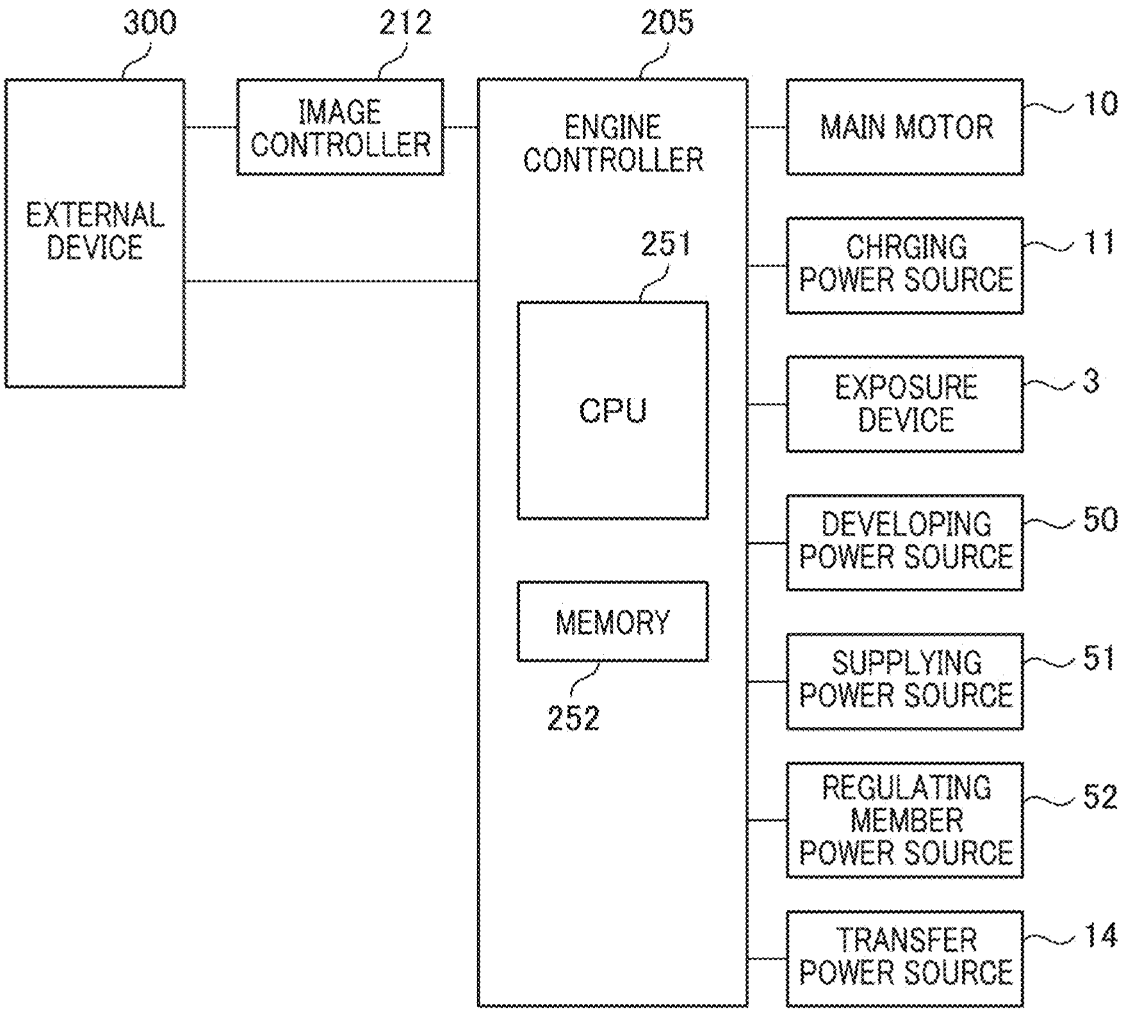
FIG. 2 is a schematic block diagram showing a control constitution of the image forming apparatus.

FIG. 2 is a block diagram showing a control constitution of the image forming apparatus 100 of this embodiment. The image forming apparatus 100 is provided with the engine controller 205 as a control means. The engine controller 205 is constituted by including a CPU 251 as an operation processing means which is a central element for performing operation processing, a memory (storing medium) 252, such as ROM, RAM, or a nonvolatile memory, as a storing means, an input/output portion (not shown), and the like. In the ROM, a control program, a data table acquired in advance, and the like are stored, and in the RAM, information on detection results of various sensors, operation (calculation) results, and the like are stored. In the nonvolatile memory, various pieces of setting information, information on a lifetime of each of members, and the like are stored. The input/output portion (I/F) transfers signals between the engine controller 205 and an external device of the engine controller 205.

To the engine controller 205, for example, a main motor 10, the charging power source 11, a developing power source 50 (described later), a supplying power source 51 (described later), a regulating member power source 52 (described later), the exposure device 3, the transfer power source 14, and the like are connected, and are operated by being controlled by the engine controller 205. Incidentally, each of the charging power source 11, the developing power source 50, the supplying power source 51, the regulating member power source 52, and the transfer power source 14 is constituted by including an associated transformer and the like. The engine controller 205 integrally controls the respective portions of the image forming apparatus 100 in accordance with the control program or the data table and causes the portions to operate.

To the engine controller 205, a print signal (a control instruction such as an image signal, a print start signal, and the like) is inputted from an external device (host computer in this embodiment) 300 such as a host computer (personal computer or the like), an image reading device or the like, and in accordance with this, the engine controller 205 controls the respective portions of the image forming apparatus 100 and causes the portions to execute a print sequence (print operation, job).

2. Photosensitive Drum

In this embodiment, the photosensitive drum 1 is constituted by laminating, on an aluminum cylinder as a supporting member formed of an electroconductive material, an undercoat layer having an electrical barrier property, a charge generating layer and a charge transporting layer in a named order. The charge transporting layer constituting an outermost surface of the photosensitive drum 1 contacting the charging roller 2 is formed using polycarbonate resin. Further, in this embodiment, a surface potential of the photosensitive drum 1 formed by being electrically charged by the charging roller 2 during image formation (hereinafter this potential is referred to also as a "dark (portion) potential") is −500 V.

3. Cleaning Blade

The cleaning blade 6 contacts the surface of the photosensitive drum 1 on a side downstream of the transfer position N and upstream of the charging position C with respect to the rotational direction of the photosensitive drum 1 bearing member, and removes the toner on the photosensitive drum 1 from the photosensitive drum 1.

The cleaning blade 101 is constituted by including a supporting metal plate and a rubber portion which has elasticity and which is fixed at a free end portion of the supporting metal plate so as to be contactable to the photosensitive drum 1. The rubber portion of the cleaning blade 101 is constituted by a plate-like member which has a predetermined length in each of a longitudinal direction and a widthwise direction substantially perpendicular to the longitudinal direction, which has a predetermined thickness, and which is formed with an elastic material. The rubber portion of the cleaning blade 101 is disposed so that a longitudinal direction thereof is substantially parallel to a direction substantially perpendicular to a movement direction of the surface of the photosensitive member. The rubber portion of the cleaning blade 101 is contacted to the surface of the photosensitive drum 1 in a counter direction to the rotational direction of the photosensitive drum 1 so that the free end portion (of the rubber portion with respect to the widthwise direction is oriented toward an upstream side of the movement direction of the surface of the photosensitive drum 1. By this, the cleaning blade 101 removes the toner from the surface of the photosensitive drum 1 in a scraping-off manner. In this embodiment, the rubber portion of the cleaning blade 1 is formed of polyurethane (urethane rubber) and 75° in Wallace hardness and 2 mm in thickness. Further, in this embodiment, the rubber cleaning blade 101 is contacted to the surface of the photosensitive drum 1 under setting of a contact angle (angle formed between itself and a tangential line of the photosensitive drum 1 at the contact portion therebetween) of 30° and a contact pressure (set pressure) of 30 gf/cm.

When the contact pressure of the cleaning blade 101 is excessively low, a cleaning property cannot be ensured, and thus improper cleaning (defective cleaning) occurs in some instances. On the other hand, when the contact pressure of the cleaning blade 101 is excessively high, a frictional force between the photosensitive drum 1 and the cleaning blade 101 becomes excessively high. Further, the cleaning blade 101 causes shuddering (vibration) and turning-up (which is a phenomenon that the free end portion of the rubber portion is turned up toward the downstream side with respect to the rotational direction of the photosensitive drum 1) in some cases. The shuddering of the cleaning blade 101 causes the improper cleaning. Further, the turning-up of the cleaning blade 101 causes the improper cleaning and leads to breakage of the device depending on the situation.

Further, even in the case where the contact angle and the contact pressure of the cleaning blade 101 are appropriately set, when the photosensitive drum 1 is continuously rotated in a state in which an amount of the toner supplied to the photosensitive drum 1 is small, in some instances, the cleaning blade 101 causes the shuddering thereof. The image forming apparatus 100 of this embodiment executes the supplying operation (described later) for suppressing the shuddering.

4. Developing Device

Figure 3:
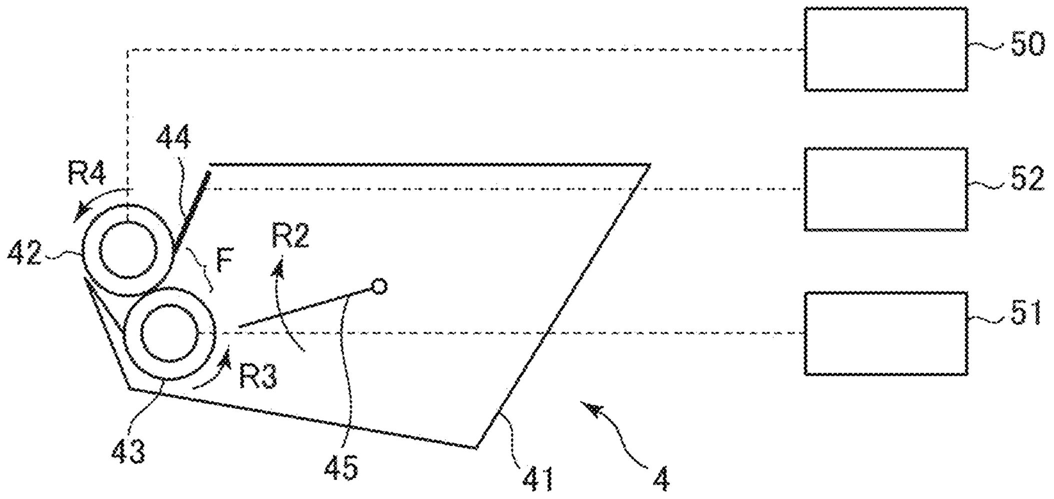
FIG. 3 is a schematic sectional view of a developing device.

FIG. 3 is a schematic sectional view of the developing device 4 in this embodiment. In this embodiment, the developing device 4 employs a contact development type system, and uses, as the developer, a negatively chargeable non-magnetic one-component developer (toner) of which normal polarity (principal charge polarity of the toner during the development) is the negative polarity. Further, in this embodiment, the developing device 4 employs a reverse development type system in which development is carried out by depositing the toner, charged to the same polarity (negative polarity in this embodiment) as the charge polarity of the photosensitive drum 1, on an image portion on the photosensitive drum 1 lowered in absolute value of the potential by being exposed to light after being charged uniformly.

The developing device 4 includes a developing container 41 as a developer accommodating portion for accommodating the toner, and the developing roller 42 as a developing member (developer carrying member) for carrying and conveying the toner. Further, the developing device 4 includes a supplying roller 43 as a developer supplying member for supplying the toner to the developing roller 42, and a developing blade 44 as a developer regulating member for regulating an absolute value of the toner carried by the developing roller 42. The supplying roller 43 and the developing blade 44 are disposed so as to contact the developing roller 42. Further, in the developing container 41 (at a substantially central portion in this embodiment), a stirring member 45 for stirring the toner and supplying the toner to the supplying roller 43 is provided. To the developing roller 42, the developing power source (high-voltage power source) 50 as a developing voltage applying means (developing voltage applying portion) is connected. Further, to the supplying roller 43, a supplying power source (high-voltage power source) 51 as a supplying voltage applying means (supplying voltage applying portion) is connected. Further, to the developing blade 44, a regulating member power source (high-voltage power source) 52 as a regulating member voltage applying means (regulating member voltage applying portion) is connected.

In this embodiment, the image forming apparatus 100 is not provided with a developing contact and separation mechanism for permitting contact of the developing roller 42 to the photosensitive drum 1 and separation of the developing roller 42 from the photosensitive drum 1. That is, in this embodiment, the developing roller 42 always contacts the photosensitive drum 1 in a state that the developing device 4 (process cartridge 17) is disposed at a predetermined position in the apparatus main assembly M. The developing roller 42 is rotationally driven in an arrow R4 direction (counterclockwise direction) in FIG. 3. That is, in a contact portion between the photosensitive drum 1 and the developing roller 42, the developing roller 42 is rotationally driven so that the surface of the photosensitive drum 1 and a surface of the developing roller 42 move in a forward direction. Further, the supplying roller 43 is rotationally driven in an arrow R3 direction (counterclockwise direction) in FIG. 3. That is, in a contact portion between the developing roller 42 and the supplying roller 43, the supplying roller 43 is rotationally driven so that the surface of the developing roller 42 and a surface of the supplying roller 43 move in opposite directions. Further, the stirring member 45 is rotationally driven in an arrow R2 direction (clockwise direction) in FIG. 3. In this embodiment, the developing roller 42, the supplying roller 43, and the stirring member 45 are rotated by transmitting a driving force thereto from the main motor 10 which is a driving source common to the main motor 10 and the photosensitive drum 1. The developing roller 42, the supplying roller 43, and the stirring member 45 are rotated in synchronism with the photosensitive drum 1, and rotations of these members are stopped in synchronism with the photosensitive drum 1. During development, to the developing roller 42, a developing voltage (developing bias) which is a DC voltage of the same polarity (negative polarity in this embodiment) as the normal polarity of the toner is applied by the developing power source 50. Further, during the development, to the supplying roller 43, a supplying voltage (supplying bias) which is a DC voltage, larger in absolute value than the developing voltage, of the same polarity (negative polarity in this embodiment) as the normal polarity of the toner is applied by the supplying power source 51. Further, during the development, to the developing blade 44, a regulating member voltage (regulating member bias) which is a DC voltage, larger in absolute value than the developing voltage, of the same polarity (negative polarity in this embodiment) as the normal polarity of the toner is applied by the regulating member power source 52.

A developing operation of the developing device 4 will be described. By the rotation of the stirring member 45, the toner is supplied to a region F in the neighborhood of the contact portion between the developing roller 42 and the supplying roller 43, and then once stored in the region F. The toner stored in the region F is supplied to the developing roller 42 by the rotation of the supplying roller 43. The toner supplied to the developing roller 42 passes through a contact portion between the developing roller 42 and the developing blade 44 and is formed in a layer (coated) in an appropriate thickness by the rotation of the developing roller 42 and then is carried on the developing roller 42. At this time, the toner supplied to the developing roller 42 is rubbed with the surface of the developing blade 44, and thus is triboelectrically charged to the negative polarity. The toner coated on the developing roller 42 is conveyed to the developing portion G which is the contact portion between the photosensitive drum 1 and the developing roller 42 by the rotation of the developing roller 42. At the developing portion G, a part of the toner coated on the developing roller 42 is transferred and deposited on the photosensitive drum 1 by an electric field formed by a potential difference between a potential of the image portion of the electrostatic latent image formed on the photosensitive drum 1 and the developing voltage applied to the developing roller 42. Thus, the electrostatic latent image is developed (visualized) into a toner image. The toner remaining on the developing roller 42 without being used for development at the developing portion G is scraped off from the surface of the developing roller 42 by the rotating supplying roller 43 at the contact portion between the developing roller 42 and the supplying roller 43, and then the toner stored in the region F is newly supplied to the surface of the developing roller 42.

Here, in the image forming apparatus of the electrophotographic type, a phenomenon that the toner is deposited on a non-image portion of the surface of the photosensitive drum 1 occurs. This phenomenon is referred to as "fog". In general, the fog is controlled by a toner difference between the surface potential of the photosensitive drum 1 and the developing roller 42 when the charged surface of the photosensitive drum 1 reaches the developing portion G. This potential difference is referred to as a "back contrast" (herein, also referred to as "Vback"). In general, Vback is set for an electric charge held by the toner so that an electric field formed between the photosensitive drum 1 and the developing roller 42 becomes an electric field in which the toner does not flow from the developing roller 42 side to the photosensitive drum 1 side. Incidentally, in this embodiment, natural attenuation of the surface potential of the photosensitive drum 1 during movement of the surface of the photosensitive drum 1 from the charging portion C to the developing portion G is to a negligible degree.

By appropriately controlling the Vback, it is possible to prevent excessive toner from being deposited on the non-image portion which is a portion on which the toner should not be deposited. In the case where the Vback is smaller than a predetermined value, an electric field for retaining the toner, charged to the normal polarity (negative polarity in this embodiment), on the developing roller 42 is weakened, so that a fog (normal fog) such that the toner charged to the normal polarity is deposited on the non-image portion of the photosensitive drum 1 occurs. Conversely, in the case where the Vback is larger than the predetermined value, the electric field for retaining the toner, charged to the normal polarity (negative polarity in this embodiment), on the developing roller 42 is strengthened. On the other hand, by the influence of this strengthened electric field, toner (reversely charged toner) charged to an opposite polarity (positive polarity in this embodiment) to the normal polarity on the developing roller 42 occurs, so that a fog (reverse charge fog) such that the reversely charged toner is deposited on the non-image portion on photosensitive drum 1 occurs.

Figure 9:
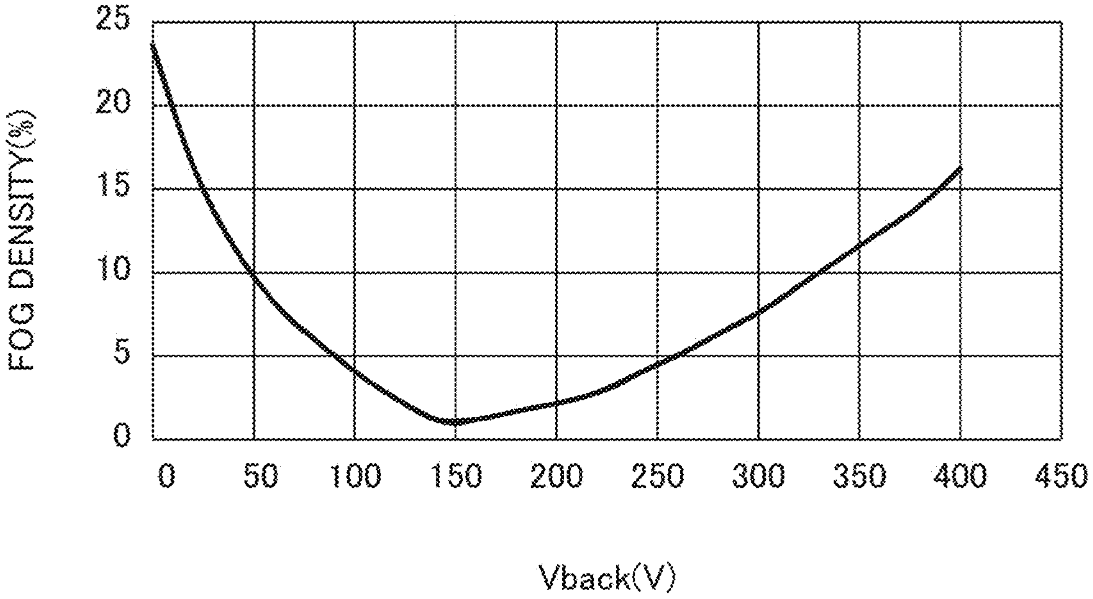
FIG. 9 is a graph showing a relationship between Vback and an amount of fog toner on the photosensitive drum in the embodiment 1.

In this embodiment, during the image formation, a charging voltage of −1000 V is applied to the charging roller 2, so that the surface of the photosensitive drum 1 is charged uniformly to a dark (portion) potential (non-image portion potential) Vd of −500 V. The charged surface of the photosensitive drum 1 is exposed to light by the exposure device 3 depending on an image signal, so that a light (portion) potential (image portion potential) Vl of −250 V is formed. Further, during the image formation, to the developing roller 42, a developing voltage Vdc of −350 V is applied. An image portion (image region) and a non-image portion (non-image region) are formed in an image formable region on the photosensitive drum 1. The image formable region is a region in which the toner is capable of being supplied from the surface of the developing roller 42 to the surface of the photosensitive drum 1. In this embodiment, a "developing contrast" which is a potential difference (=|Vl−Vdc|) between the light potential Vl and the developing voltage Vdc on the photosensitive drum 1 at the developing portion G during the image formation (hereinafter, this developing contrast is referred to as "Vcont") is 100 V (the developing voltage Vdc is higher than the light potential Vl on a normal polarity side of the toner). Further, in this embodiment, a back contrast Vback which is a potential difference (=|Vd−Vdc) between the dark potential Vd and the developing voltage Vdc on the photosensitive drum 1 at the developing portion G is 150 V (the dark-portion potential Vd is higher than the developing voltage Vdc on the normal polarity side of the toner). As further described later, in this embodiment, during the image formation, the Vback is set to 150 V so that an amount of the toner that caused the fog (hereinafter, also referred to as "fog toner") becomes a smallest amount (FIG. 9). Incidentally, each of Vcont and Vback is represented by a potential difference between a surface potential of the photosensitive drum 1 at the developing portion G and the developing voltage applied to a core metal of the developing roller 42. Further, the voltage is represented by a potential difference with a ground potential (0 V).

5. Exposure Device

Figure 4:
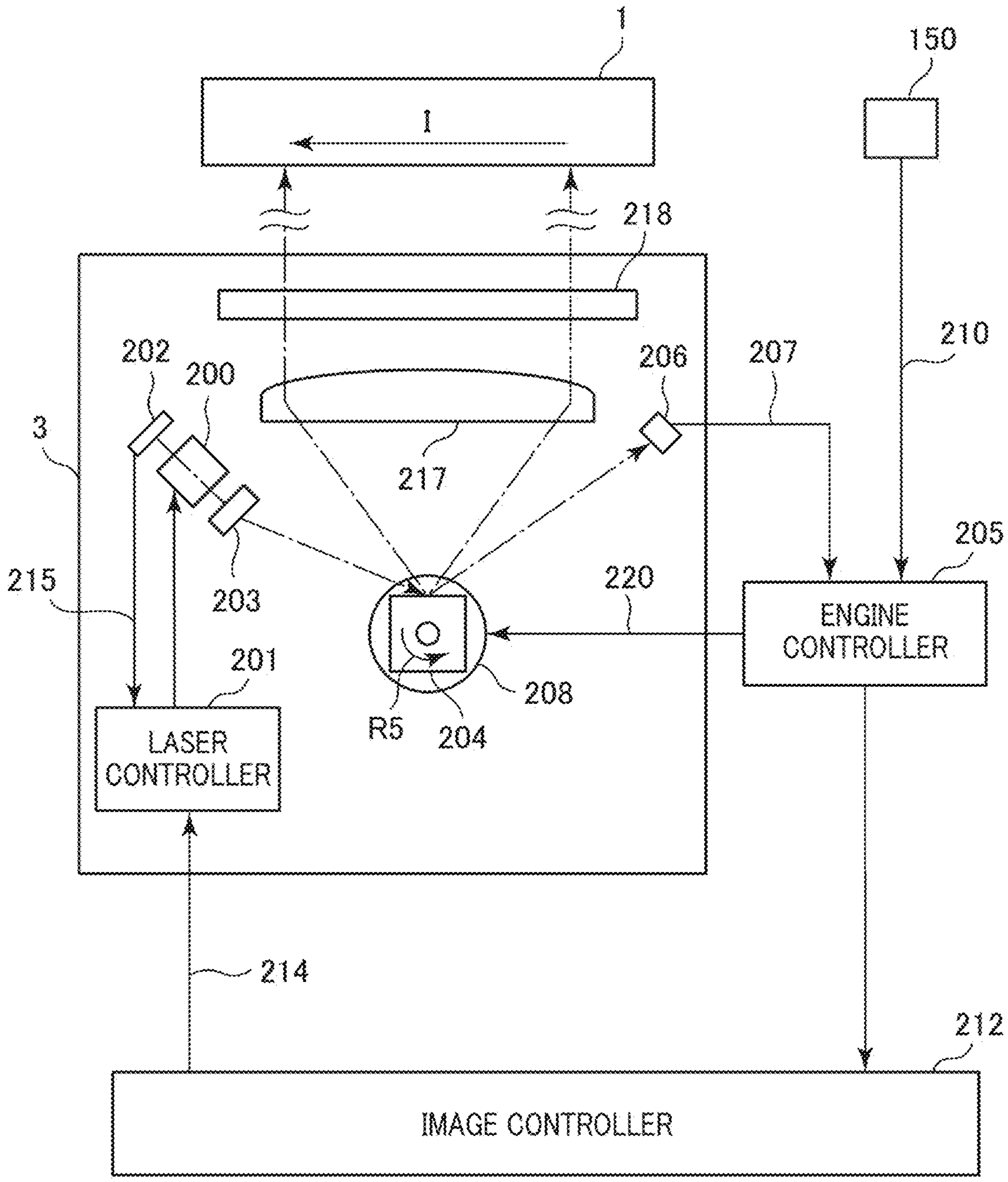
FIG. 4 is a schematic view of an exposure device.

FIG. 4 is a schematic view showing a structure of the exposure device 3 and a periphery thereof in this embodiment. In this embodiment, the exposure device 3 is constituted by a laser scanner (laser exposure device).

To the exposure device 3, the engine controller 205 and an image controller 212 are connected. The engine controller 205 and the image controller 212 control an operation of the exposure device 3. In this embodiment, the engine controller 205 and the image controller 212 are provided on different substrates. The exposure device 3 includes a laser light source 200, a collimator lens 203, a polygon mirror 204, a photodiode (PD) 202, a beam detection (BD: Beam Detect) sensor 206, an f-θ lens 217, and a fold-back mirror 218. Further, the exposure device 3 includes a laser controller 201 for carrying out light emission control of the laser light source 200 depending on a video signal (image data signal) 214 inputted from the image controller 212. On the basis of an image signal inputted from a host computer 300 (FIG. 2), the image controller 212 performs processing for generating the video signal 214 for carrying out the light emission control of the exposure device 3, or the like.

The laser light source 200 emits laser light in two directions by a light-emitting element. Laser light emitted in one direction from the laser light source 200 enters the photodiode 202. The photodiode 202 converts the incident light into an electric signal and sends as a PD signal 215 to the laser controller 201. On the basis of the PD signal 215, the laser controller 201 carries out output light quantity control (APC: Auto Power Control) of the laser light source 200 so that the laser light has a predetermined light quantity. Laser light emitted in the other direction from the laser light source 200 is irradiated to the polygon mirror 204 via the collimator lens 203. The polygon mirror 204 is a rotatable polygonal mirror which has a plurality of reflection surfaces and which is rotationally driven in an arrow R5 direction (counterclockwise direction) in FIG. 4 by a polygon (mirror) motor 208. The polygon mirror 204 in this embodiment has four reflection surfaces (faces). The polygon motor 208 rotationally drives the polygon mirror 204 depending on a driving signal 220 outputted from the engine controller 205. When a print start signal is inputted from the host computer 300 (FIG. 2) to the engine controller 205, the engine controller 205 starts a print sequence as described later, so that the engine controller 205 starts not only rotational drive of the photosensitive drum 1 and the like but also rotational drive of the polygon mirror 204. The laser light irradiated to the polygon mirror 204 is deflected in a direction of the photosensitive drum 1 by the reflection surface. By the rotation of the polygon mirror 204, a deflection angle changes. By this change in deflection angle, the surface of the photosensitive drum 1 is scanned with the laser light with respect to an arrow I direction (direction substantially perpendicular to a movement direction of the surface of the photosensitive drum 1) in FIG. 4. This laser light is corrected in optical path by the f-θ lens 217 so as to scan the photosensitive drum 1 at a constant speed, and the photosensitive drum 1 is irradiated with the laser light via the fold-back mirror 218.

The laser light deflected by the polygonal mirror 204 is partially received by the BD sensor 206. In this embodiment, the BD sensor 206 is disposed at a position where the laser light is capable of being detected before the scanning of the photosensitive drum 1 with the laser light is started. On the basis of the detected laser light, the BD sensor 206 generates a BD signal 207 having a first level and a second level, and sends the BD signal 207 to the engine controller 205. The BD signal 207 is, for example, a negative logic signal, and is a detection signal such that the level thereof is the first level (Low) during detection of the laser light by the BD sensor 206 and is the second level (High) during non-detection of the laser light by the BD sensor 206. On the basis of the acquired BD signal 207, the engine controller controls the polygon motor 208 so that a rotation period of the polygon mirror 204 becomes a predetermined period. The engine controller 205 discriminates that a period of the BD signal 207 becomes a predetermined period and thus the rotation period of the polygon mirror 204 is stable. That is, the engine controller 205 adjusts the driving signal 220 on the basis of the BD signal 207 and thus carries out feed-back control so that the rotation of the polygon mirror 204 is stabilized at the predetermined period. Further, the Top sensor 150 sends, to the engine controller 205, a recording material detection signal 210 generated by detecting a leading end of the recording material S. On the basis of the BD signal 207 and the recording material detection signal 210, the engine controller 205 causes the image controller 212 to input the video signal 214 to the laser controller 201, so that the engine controller 205 causes the laser controller 201 to perform an exposure operation depending on the video signal 214.

6. Print Sequence

Next, the print sequence (print operation, job) in this embodiment (embodiment 1) will be described.

Figure 5:
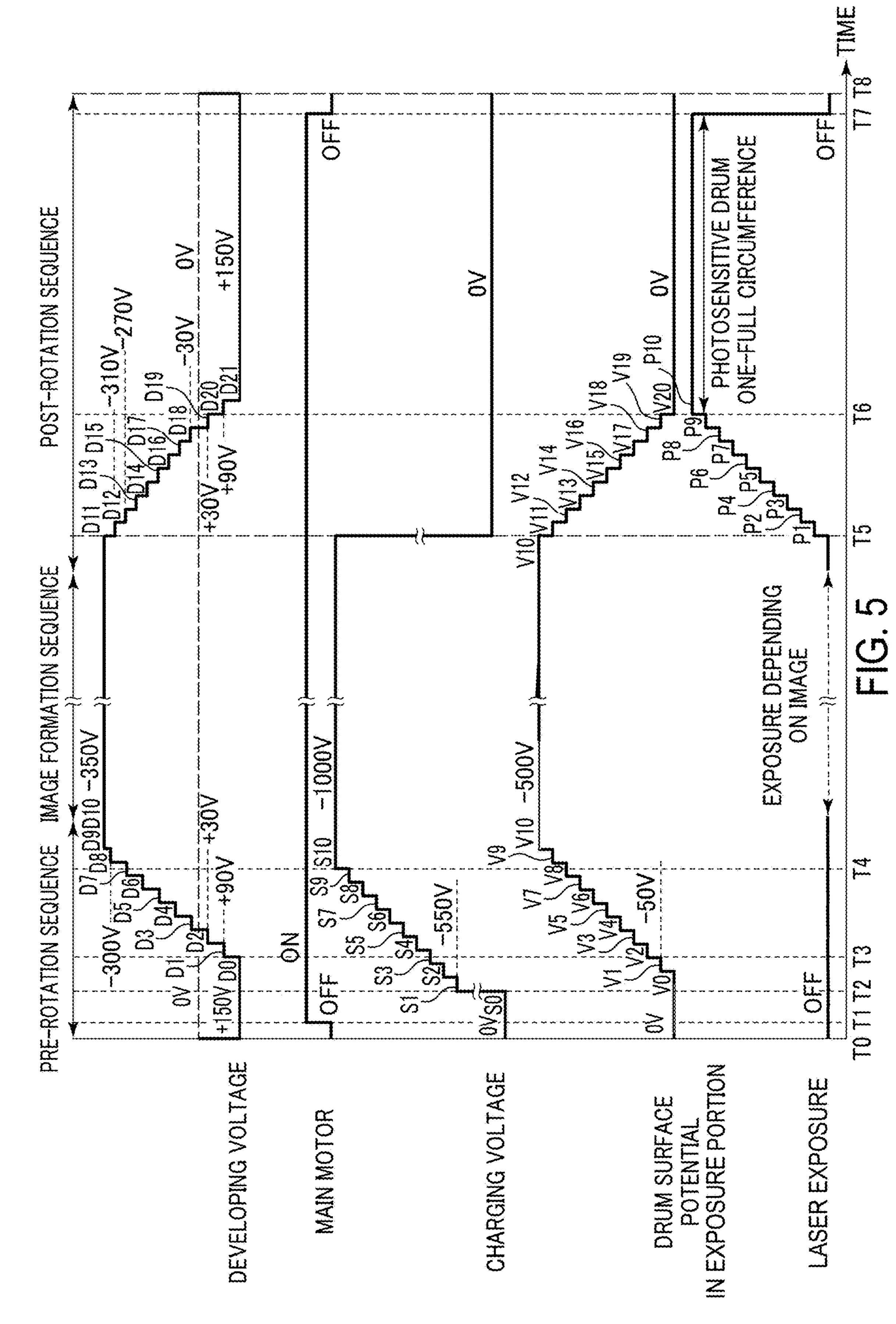
FIG. 5 is a timing chart of a print sequence of an embodiment 1.

FIG. 5 is a timing chart showing a print sequence in this embodiment. In FIG. 5, progressions of the developing voltage, the charging voltage, operations of the main motor 10 and the exposure device 3 (laser exposure), and the surface potential of the photosensitive drum 1 in the print sequence are shown. Operations described below in the print sequence are controlled by the engine controller 205.

Incidentally, in this embodiment, each of the charging voltage and the developing voltage is subjected to constant-voltage control, and in the timing chart, the charging voltage and the developing voltage are target values (target values) of the charging voltage and the developing voltage, respectively. Incidentally, the constant-voltage control is control such that output of the power source is adjusted so that a voltage applied to an application object becomes substantially constant at the target voltage. Further, in the timing chart, the surface potential of the photosensitive drum 1 shows a potential in the exposure portion E. However, in this embodiment, as described above, the natural attenuation of the surface potential of the photosensitive drum 1 during movement of the surface of the photosensitive drum 1 from the charging portion C to the developing portion G is to the negligible degree. Further, in the timing chart, "T0", "T1", "T2", and the like represent timings. Further, for convenience, magnitudes (high/low) of the voltages and the potential refer to magnitudes (high/low) when the voltages and the potential are compared in terms of absolute values unless otherwise particularly specified.

The print sequence consists of a "pre-rotation sequence (pre-rotation operation)", an "image forming sequence (image forming operation)", and a "post-rotation sequence (post-rotation operation)". The pre-rotation sequence is control such that the surface potential of the photosensitive drum 1 is raised (increased) from 0 V to the dark potential Vd which is the surface potential for image formation. The image forming sequence is a sequence such that the surface potential of the photosensitive drum 1 is partially dropped to the light potential Vl which is the surface potential for the image formation by performing the laser exposure corresponding to the image signal for the image formation after the surface potential of the photosensitive drum 1 is raised to the dark potential Vd. The post-rotation sequence is control such that the surface potential of the photosensitive drum 1 after the image formation is lowered from the dark potential Vd to 0 V. In this embodiment, the dark potential Vd is −500 V, and the light potential Vl is −250 V. Incidentally, the during the image formation (during the image forming operation) corresponds to a period of the above-described image forming sequence. Further, during the non-image formation (during the non-image forming operation) is a period other than the during the image formation, and corresponds to a period of the above-described pre-rotation sequence or a period of the above-described post-rotation sequence.

In this embodiment, during the non-image formation, by carrying out control such that the Vback is made smaller than the Vback during the image formation, the fog toner is supplied to the cleaning portion B, so that a frictional force between the photosensitive drum 1 and the cleaning blade 101 is reduced ("supplying operation"). By this, not only the "shuddering" of the cleaning blade 101 is suppressed, but also "improper cleaning" due to the slip of the toner through the cleaning blade 101 can be suppressed.

<Pre-Rotation Sequence>

First, the pre-rotation sequence will be described.

When the engine controller 205 acquires the print signal from the host computer, application of the developing voltage to the developing roller 42 by the developing power source 50 is started (T0). In this embodiment, as described above, in the post-rotation sequence, the surface potential of the photosensitive drum 1 is dropped to 0 V. In the pre-rotation sequence, in order to maintain the Vback at 150 V during actuation of the photosensitive drum 1, in a timing T0, application of a developing voltage of +150 V which is the developing voltage of the positive polarity is started. The high-voltage power source takes a time required for an output voltage to rise up to a target voltage. For that reason, after the application of the developing voltage is started and then a time required to end rising of the developing voltage has elapsed, the main motor 10 is started (ON), so that rotation of the photosensitive drum 1 is passed (T1). The number of rotations is controlled so as to become a predetermined number of rotations, on the basis of the above-described BD signal 207. The main motor 10 takes a time required for the number of rotations up to a target number of rotations. For that reason, after the main motor 10 is started and then a time required to end rising of the main motor 10 has elapsed, application of a first charging voltage S1 to the charging roller 2 by the charging power source 11 is started (T2).

The charging voltage is controlled so as to be raised in a step form (stepwise) from the first charging voltage S1 to a tenth charging voltage S10 with a fluctuation width (change width) of 50 V per 30 ms. Incidentally, control such that the voltage (or a potential) is raised in the step form (stepwise) in such a manner is also referred to as "stepwise rising control". Here, (stepwise 9 rising of the voltage in the step form with the fluctuation width of 50 V per 30 ms refers to that a target voltage in each stage changed by 50 V is retained for 30 ms. A retention time of the target voltage in each stage is set so that an output voltage of the high-voltage power source becomes a target voltage in at least a part of a period of each stage. This is also true for the case where the voltage is caused to fall in a step form (stepwise) as described later. In this embodiment, the first charging voltage S1 at a time (T2) of a start of the stepwise rising control of the charging voltage is −550 V, and the tenth charging voltage S10 in the final stage (T2) of the stepwise rising control of the charging voltage is −1000 V. Further, as described above, the fluctuation width of the charging voltage per stage is 50 V. Incidentally, a charging voltage (OFF, 0V) from the timing T0 when the pre-rotation sequence is started to the timing T2 when the stepwise rising control of the charging voltage is started is S0.

The surface potential of the photosensitive drum 1 is retained at 0V until the timing T2 when the application of the charging voltage is started. After the stepwise rising control of the charging voltage is started, the surface potential of the photosensitive drum 1 becomes large from a first surface potential V1 to a tenth surface potential V10 in a step form (stepwise) correspondingly to the charging voltage. In this embodiment, the first surface potential V1 is −50 V correspondingly to the first charging voltage S1 at the time of the start of the stepwise rising control of the charging voltage, and the tenth surface potential V10 is −500 V correspondingly to the tenth charging voltage S10 in the final stage of the stepwise rising control of the charging voltage. Further, the fluctuation width per stage of the surface potential of the photosensitive drum 1 is 50 V. That is, the surface potential of the photosensitive drum 1 is raised from the first surface potential V1 to the tenth surface potential V10 in the step form (stepwise) with the fluctuation width of 50 V per 30 ms. Here, in this embodiment, a discharge start voltage (discharge threshold) between the photosensitive drum 1 and the charging roller 2 is about 500 V. Incidentally, the surface potential (0V) of the photosensitive drum 1 from the start of the pre-rotation sequence until the stepwise rising control of the surface potential of the photosensitive drum 1 is started is V0.

The developing voltage is controlled so that the Vback gradually becomes small from 150 V which is Vback during the image formation. That is, correspondingly to the stepwise rising control of the charging voltage (surface potential of the photosensitive drum 1), the developing voltage is raised in the step form (stepwise) so that the Vback gradually becomes small from 150 V which is the Vback during the image formation. In this embodiment, the developing voltage is successively raised up to −330 V which is an eighth developing voltage D8 with a fluctuation width per stage of the developing voltage of 60 V in a manner such that a first developing voltage D1 at a time (T3) of a start of the stepwise rising control of the developing voltage is +90 V and then a second developing voltage D2 is +30 V. Thereafter, the fluctuation width of the developing voltage is changed to 20 V, and thus a ninth developing voltage D9 is −350 V. Further, a tenth developing voltage D10 is −350 V which is the same as the ninth developing voltage D9. Thus, the developing voltage is switched and raised in the step form (stepwise) every 30 ms from the first developing voltage D1 to the ninth developing voltage D9 (the tenth developing voltage D10). Incidentally, a developing voltage (+150 V) from the timing T0 when the pre-rotation sequence is started to the timing T3 when the stepwise rising control of the developing voltage is started is DO.

Figure 6:
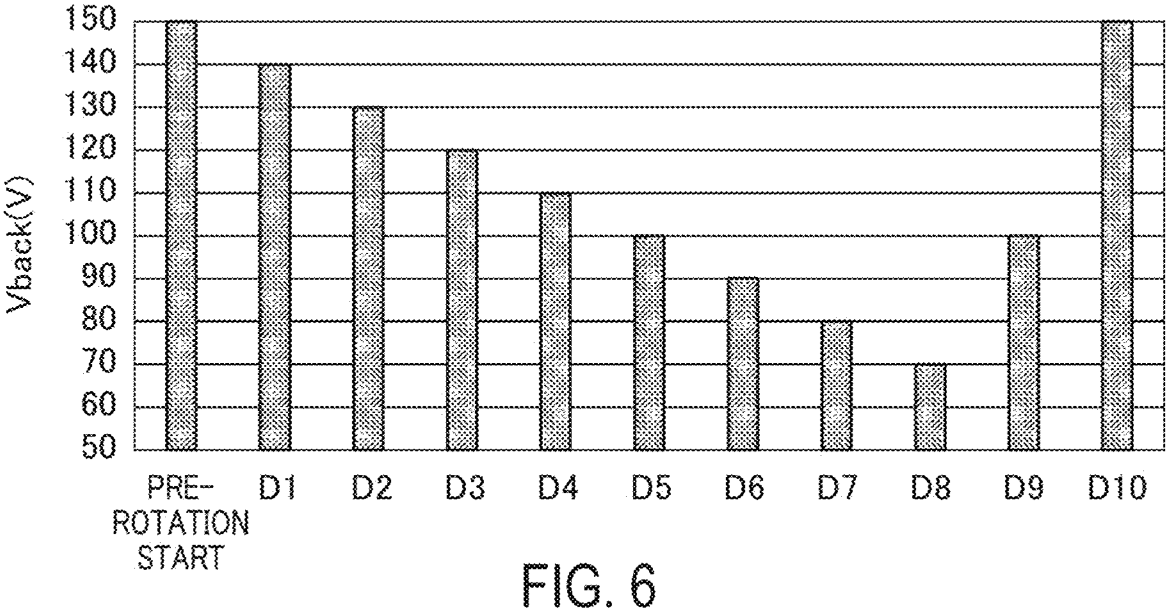
FIG. 6 is a graph showing a progression of Vback in a pre-rotation sequence in the embodiment 1.

FIG. 6 is a graph showing a progression of the Vback in the pre-rotation sequence in this embodiment. In FIG. 6, values of the Vback at the time of the start of the pre-rotation sequence (during application of the developing voltage DO) and during application of the first to tenth developing voltages D1 to D10, respectively, are shown. As shown in FIG. 6, in this embodiment, by controlling the developing voltage and the surface potential of the photosensitive drum 1 in the above-described manners, the Vback can be gradually made small from 150 V which is the Vback during the image formation in the pre-rotation sequence. Incidentally, in this embodiment, from the eighth developing voltage D8 to the tenth developing voltage D10, the Vback is gradually made large toward the Vback during the image formation.

<Image Forming Sequence>

Next, the image forming sequence will be described. In this embodiment, as described above, during the image formation, the surface potential of the photosensitive drum 1 is −500 V which is a dark potential optimum for the image formation. For that reason, during the image formation, a charging voltage of −1000 V is applied to the charging roller 2 by the charging power source 11. On the other hand, during the image formation, a developing voltage of −350 V is applied to the developing roller 42 by the developing power source 50. That is, in this embodiment, during the image formation, the Vback is 150 V similar to the Vback at the toner of the start of the pre-rotation sequence.

Further, the engine controller 205 controls, as described above, the polygon motor 208 so that the number of rotations of the polygon mirror 204 becomes the predetermined number of rotations. That is, the engine controller 205 adjusts the driving signal 220 so that an acquiring period of the BD signal sent from the BD sensor 206 becomes constant, and subjects the number of rotations of the polygon motor 208 to feed-back control. Then, when the engine controller 205 receives the print signal from the host computer 300, the engine controller 205 starts a feeding operation of the recording material S by controlling the feeding roller 8 so as to rotate after a lapse of a predetermined time. The recording material S is conveyed from the cassette 7 toward the conveying roller 9 along the conveying passage. When the recording material S is detected by the Top sensor 150 provided in the conveying passage in the neighborhood of a side downstream of the conveying roller 9 with respect to the conveying direction of the recording material S, a Top signal 210 is sent from the Top sensor 150 to the image controller 212 by way of the engine controller 205. When the image controller 212 receives the Top signal 210, the image controller 212 sends, to the laser controller 201, the video signal 214 synchronized with the Top signal 210 after a lapse of a predetermined time. By this, the image controller 212 performs synchronization between the image and the recording material S with respect to a sub-scan direction (the conveying direction of the recording material S). Further, the image controller 212 sends the video signal 214 to the laser controller 201 in synchronism with the BD signal 207, so that the image controller 212 performs synchronization between the image and the recording material S with respect to a main scan direction (a direction perpendicular to the conveying direction of the recording material S).

When the image controller 212 receives the image signal (image data) corresponding to the output image from the host computer 300, the image controller 212 performs appropriate image processing and then converts the image signal into the video signal 214, and synchronizes the video signal 214 with the Top signal 210 and the BD signal 207 and then sends the video signal 214 to the laser controller 201.

The laser controller 201 controls ON and OFF of the laser light source 200 in accordance with the video signal 214 sent from the image controller 212. The surface potential of the photosensitive drum 1 is controlled to the dark potential Vd of −500 V until the photosensitive drum surface is subjected to the laser exposure. On the other hand, the surface potential of the photosensitive drum 1 becomes the light potential V1 of −250 V after the photosensitive drum surface is subjected to the laser exposure. When the surface of the photosensitive drum 1 passes through the developing portion G, the toner electrically urged is transferred from the surface of the developing roller 42 onto the image portion (portion of the light potential V1) of the surface of the photosensitive drum 1, so that the toner image is formed on the surface of the photosensitive drum 1 corresponding to a laser exposure portion.

The image formation as described above is started from a leading end portion of the image with respect to the conveying direction (a movement direction of the surface of the photosensitive drum 1, and is continued to a trailing end portion of the image with respect to the conveying direction. Further, the image formation as described above is carried out by the number of times corresponding to the number of printed sheets.

<Post-Rotation Sequence>

Next, the post-rotation sequence will be described.

Figure 7:
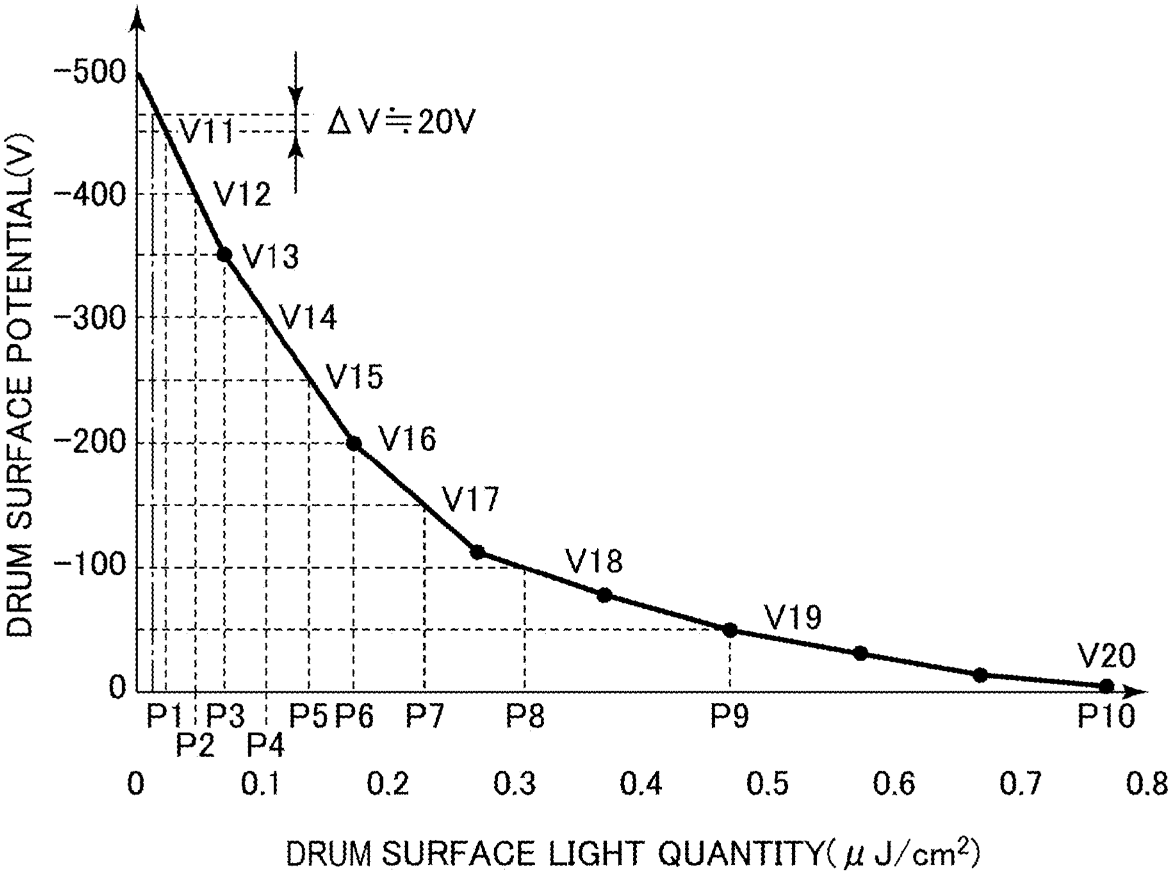
FIG. 7 is a graph showing a relationship between an exposure amount and a surface potential of a photosensitive drum in the embodiment 1.

In the image forming sequence, when the image formation until the trailing end portion of the image is ended, at the same time when the application of the tenth charging voltage S10 is ended, light emission of the laser light source 200 is started by the laser controller 201, and exposures of the surface (substantially whole area of the image formable region) of the photosensitive drum 1 to light is performed in a first exposure amount P1 (T5). The exposure is carried out in the first exposure amount P1, so that the surface potential of the photosensitive drum 1 is dropped from −500 V which is the tenth surface potential V10 to −450 V which is an eleventh surface potential V11 by 50 V. When the exposure in the first exposure amount P1 is ended, the exposure is carried out in a second exposure amount P2 larger than the first exposure amount P1, so that the surface potential of the photosensitive drum 1 is dropped from −500 V which is the tenth surface potential V10 to −400 V which is a twelfth surface potential V12 by 100 V. Thereafter, similarly, the exposure is carried out from in a third exposure amount P3 to in a tenth exposure amount P10, ten times in total from in the first exposure amount P1, so that the surface potential of the photosensitive drum 1 is dropped from −500 V which is the tenth surface potential V10 to 0V which is a twentieth surface potential V20 by 500 V. The exposure, which is the final exposure, in the tenth exposure amount P10 is carried out from a timing T6 to a timing T7 over a time corresponding to one-full rotation of the photosensitive drum 1. That is, until the surface potential of the photosensitive drum 1 becomes 0V which is the twentieth surface potential in the full circumference of the photosensitive drum 1, the exposure, which is the tenth exposure, in the tenth exposure amount P10 is continued (T7). Thus, with the fluctuation width of 50 V per 30 ms, the surface potential of the photosensitive drum 1 is caused to fall in a step form (stepwise) from the tenth surface potential V10 to the twentieth surface potential V20. Incidentally, control in which the voltage (or the potential) is caused to fall in the step form (stepwise) in such a manner is also referred to as "stepwise falling control". FIG. 7 is a graph showing a relationship between the exposure amounts P1 to P10 for forming the surface potentials V11 to V20 of the photosensitive drum 1 with the surface potentials V11 to V20 in the post-rotation sequence. In FIG. 7, the abscissa represents a laser light quantity at the surface of the photosensitive drum 1 in the exposure portion E, and the ordinate represents the surface potential of the photosensitive drum 1 formed in the laser light quantity.

Further, also, in the post-rotation sequence, similarly as in the pre-rotation sequence, control in which the developing voltage is switched in the step form (stepwise) (the stepwise falling control) is carried out. In this embodiment, the developing voltage is controlled so that the Vback gradually becomes small from 150 V which is Vback during the image formation. That is, correspondingly to the stepwise falling control of the surface potential of the photosensitive drum 1, the developing voltage is caused to fall in the step form (stepwise) so that the Vback gradually becomes small from 150 V which is the Vback during the image formation. In this embodiment, the developing voltage is successively caused to fall to −30 V which is an eighteenth developing voltage V18 with a fluctuation width per stage of the developing voltage of 40 V in a manner such that the developing voltage is caused to fall from −350 V which is tenth developing voltage D10 at a time (T5) of a start of the stepwise falling control of the developing voltage, to an eleventh developing voltage D11 of −310 V and then to a twelfth developing voltage D12 of −270 V. Thereafter, the fluctuation width of the developing voltage is changed to 60 V, and thus a nineteenth developing voltage D19 is +30 V, a twentieth developing voltage D20 is +90 V, and a twenty-first developing voltage D21 is +150 V. Thus, the developing voltage is switched and caused to fall in the step form (stepwise) every 30 ms from the tenth developing voltage D10 to the twenty-first developing voltage D21.

Figure 8:
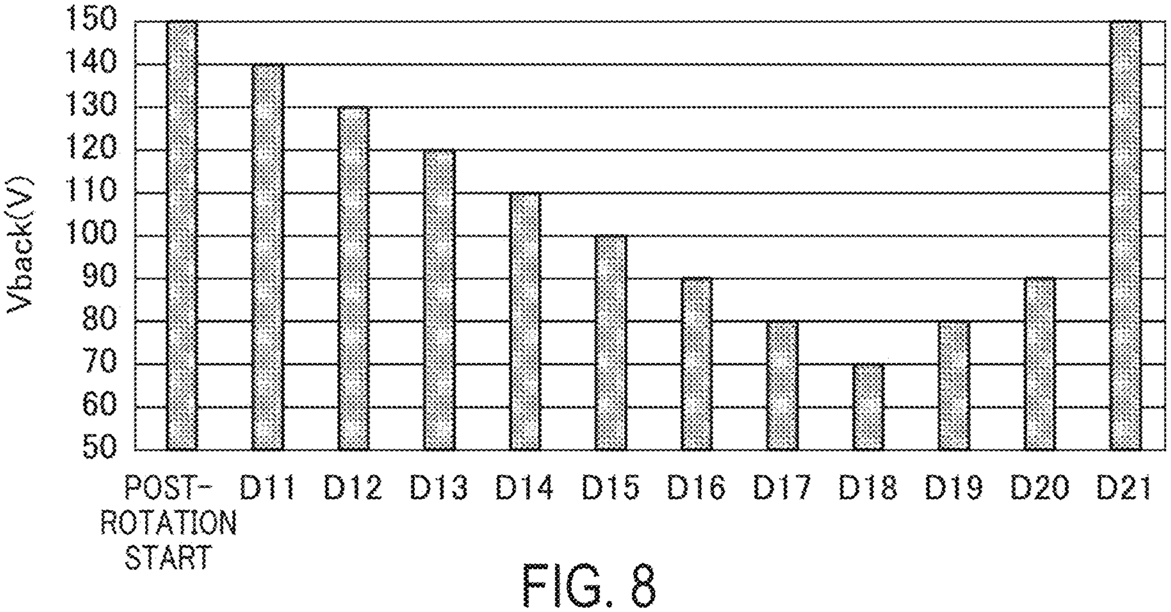
FIG. 8 is a graph showing a progression of Vback in a post-rotation sequence in the embodiment 1.

FIG. 8 is a graph showing a progression of the Vback in the post-rotation sequence in this embodiment. In FIG. 8, values of the Vback at the time of the start of the post-rotation sequence (during application of the developing voltage D10) and during application of the eleventh to twenty-first developing voltages D10 to D21, respectively, are shown. As shown in FIG. 8, in this embodiment, by controlling the developing voltage and the surface potential of the photosensitive drum 1 in the above-described manners, the Vback can be gradually made small from 150 V which is the Vback during the image formation also in the post-rotation sequence. Incidentally, in this embodiment, from the eighteenth developing voltage D18 to the twenty-first developing voltage D21, the Vback is gradually made large toward the Vback at the time of a stop of rotation of the photosensitive drum 1.

The main motor 10 is stopped in rotation (OFF) at the timing T7 when the exposure which is the final exposure in the post-rotation sequence is ended in the tenth exposure amount. Further, at a timing T8 when the main motor 10 is completely stopped in rotation after inertial rotation of the main motor 10, application of +150 V which is the twenty-first developing voltage D21 is ended. The complete stop in rotation of the main motor 10 and the end of the voltage application end the print sequence (print operation).

7. Effect

Next, an effect of this embodiment will be described.

FIG. 9 is a graph showing a relationship between the Vback and the fog toner in the constitution of this embodiment. In FIG. 9, the abscissa represents the Vback, and the ordinate represents a fog density (%) corresponding to an amount of the fog toner. The fog density was measured in the following manner by using a reflection density meter ("TC-6DS/A30", manufactured by Tokyo Denshoku Co., Ltd.). The fog toner on the photosensitive drum 1 when predetermined Vback is provided is deposited on a transparent tape after rotation of the photosensitive drum 1 is stopped, and then the tape is stuck on predetermined paper. A measured value (average reflectance, degree of whiteness) of a reflection density in this state is taken as Ds (%). Further, a measured value (average reflectance, degree of whiteness) of the reflection density in a state in which a tape on which the fog toner is not deposited to stuck on the above-described predetermined paper is taken as Dr (%). Then, from a difference between Ds (%) and Dr (%), the fog density (=Dr (%)−Ds (%)) was calculated. As shown in FIG. 9, there is an optimum value for the Vback, and a minimum value of the amount of the fog toner cannot be obtained even when the Vback is excessively small or excessively large. In general, during the image formation, the Vback is set so that the fog toner amount becomes minimum.

In this embodiment, in the pre-rotation sequence and the post-rotation sequence, a period (time zone) in which the Vback is made smaller than the Vback during the image formation is provided. By this, in the pre-rotation sequence and the post-rotation sequence, it is possible to provide a period in which the fog toner of the normal charge polarity generates.

Then, by supplying the thus generated fog toner to the cleaning portion B, the toner and an external additive can be stagnated at a free end of the cleaning blade 101 on a free end portion side. By this, a lubricating property is imparted between the photosensitive drum 1 and the cleaning blade 101, so that the "shuddering" of the cleaning blade 101 can be suppressed.

Figure 10:
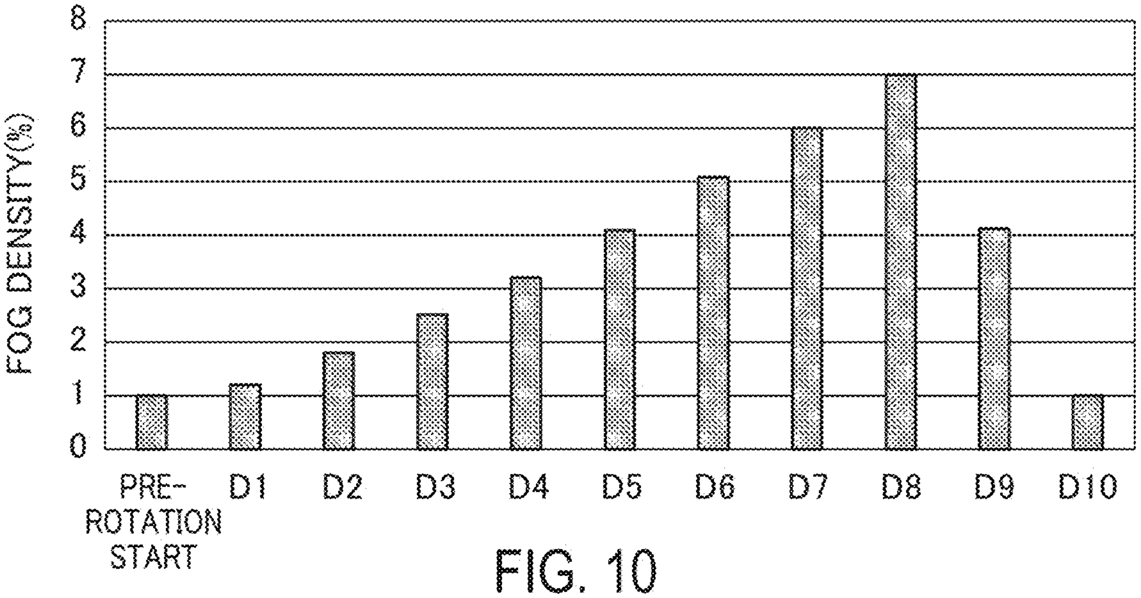
FIG. 10 is a graph showing a progression of the amount of the fog toner in the pre-rotation sequence in the embodiment 1.

Here, the period in which the Vback is made smaller than the Vback during the image formation is made not less than a time corresponding to one full rotation of the developing roller 42 (i.e., a time corresponding to at least one full rotation of the developing roller 42). Particularly, it is preferable that a period in which the fog density (%) becomes 3% or more by making the Vback smaller than the Vback during the image formation is not less than the time corresponding to the one full rotation of the developing roller 42 (i.e., the time corresponding to at least one full rotation). Incidentally, a length of the period in which the Vback is made smaller than the Vback during the image formation is, in the case where a plurality of periods each in which the Vback is made smaller than the Vback during the image formation, a length which is a sum of these periods. In this embodiment, the time corresponding to the one full rotation of the developing roller 42 is about 103 ms (outer diameter: 11.5 mm, peripheral speed: 350 mm/s). Further, in this embodiment, in the pre-rotation sequence, the period in which the Vback is made smaller than the Vback during the image formation is 270 ms which is the time of application of the first to ninth developing voltages D1 to D9 (FIG. 6). Particularly, the period in which the fog density (%) becomes 3% or more is 180 ms which is the time of application of the fourth to ninth developing voltages D4 to D9 as described later (FIG. 10). Further, in this embodiment, in the post-rotation sequence, the period in which the Vback is made smaller than the Vback during the image formation is 300 ms at the time of application of the eleventh to twelfth developing voltages D11 to D20 (FIG. 8). Particularly, the period in which the fog density (%) becomes 3% or more is 210 ms which is the time of application of the fourteenth to twentieth developing voltages D14 to D20. In the case where the period in which the Vback is made smaller than the Vback during the image formation, it becomes difficult to supply, to the cleaning portion B, the fog toner in an amount enough to suppress the “shuddering”. On the other hand, when the period in which the Vback is made smaller than the Vback during the image formation is made excessively long, there is a possibility that the excessively long period has the influence on productivity. Particularly, in the case where the period in which the Vback is made smaller than the Vback during the image formation is provided in the pre-rotation sequence, an FPOT (a time from an input of the print signal until a first recording material on which the image is formed is outputted) becomes long.

Although the above-described period is not limited thereto, the period in which the Vback is made smaller than the Vback during the image formation is enough in many instances when the period is not more than a time corresponding to 10 full rotations (typically 5 full rotations), and further, this may also be preferable from a viewpoint of suppressing the influence on the productivity.

Here, in a state in which the “shuddering” of the cleaning blade 101 is liable to occur, a frictional force between the photosensitive drum 1 and the cleaning blade 101 increases. In such a condition, as a supplying operation, when a predetermined toner pattern (solid black or thin line) is formed on the photosensitive drum 1 by a step similar to a step during normal image formation in which the image is transferred onto the recording material S, the following occurs in some instances. That is, due to a fluctuation in frictional force between the photosensitive drum 1 and the cleaning blade 101 during the supplying operation, a contact state of the free end of the cleaning blade 101 to the photosensitive drum 1 becomes unstable in some instances. As a result, improper cleaning sometimes occurs due to a slip of the toner itself of the toner pattern through the cleaning blade 101.

On the other hand, the fog toner generating in the case where the Vback is smaller than the Vback in a state in which the fog toner amount becomes minimum has a tendency that an absolute value of the electric charge is relatively small, that a mirror force with the photosensitive drum 1 is relatively low, and that toner which is small in non-electrostatic depositing force and which is large in particle size is large in amount. For that reason, as the supplying operation, by supplying the fog toner of the normal charge polarity to the cleaning portion B after the period in which the Vback is made smaller than the Vback during the image formation is provided, so that the slip of the toner itself, supplied to the cleaning portion B during the supplying operation, through the cleaning blade 101 does not readily occur.

Further, as an effect other than the above-described effect, such an effect that the toner supply amount can be gradually increased and thus the supplying operation in which the fluctuation in frictional force is made small becomes possible, and a contact state of the free end of the cleaning blade 101 does not readily become unstable can be obtained. Further, the period in which the Vback is made smaller than the Vback during the image formation is made not less than the time corresponding to one full rotation of the developing roller 42, whereby in a section which is the latter-half section of this period in which the toner supply amount becomes large, a tendency that the toner larger in particle size is supplied to the cleaning portion can be shown. For that reason, even when the toner supply amount is large, the slip of the toner itself through the cleaning blade 101 does not readily occur, so that a higher effect can be obtained. This would be considered because the particle size of the toner coated on the developing roller 42 is different between a state (after white) in which the developing roller 42 is rotated in a condition of no toner consumption and a state (after black) in which the developing roller 42 is rotated in a condition of toner consumption and there is a tendency that the particle size becomes large in the latter case. That is, the period in which the Vback is made smaller than the Vback during the image formation is made not less than the time corresponding to one full rotation of the developing roller 42, whereby the state in which the developing roller 42 is rotated in the toner consumption condition can be created. Then, in that state, the section in which the toner supply amount becomes large is formed, so that the toner larger in particle size can be supplied to the cleaning portion B.

Further, in this embodiment, the rotation of the developing roller 42 is started from the state in which the Vback is 150 V. This is because at the time of the start of rotation of the developing roller 42, due to a (rotation) stop time of the developing roller 42, the electric charge amount of the toner carried on the developing roller 42 from a contact portion between the developing roller 42 and the developing blade 44 to a contact portion between the photosensitive drum 1 to the developing roller 42 with respect to the rotational direction of the developing roller 42 becomes unstable. That is, when the fog toner is intended to be supplied from an initial stage of the rotation of the developing roller 42, the toner supply amount fluctuates in some instances due to an unstable charge amount of the toner. Accordingly, in this embodiment, at the time of the start of the rotation of the developing roller 42, the Vback is set to the same value as the Vback during the image formation. Then, the rotation of the developing roller 42 is made, and the Vback is changed after a timing when the toner on the developing roller 42 passed through the contact portion with the developing blade 44 reaches the developing portion G. However, particularly, in a condition that the charge amount of the toner is stable, the Vback at the time of the start of the rotation of the developing roller 42 is not limited to the Vback in this embodiment, but the Vback may also be made smaller than the Vback during the image formation from the initial stage.

Thus, in this embodiment, in the pre-rotation sequence and the post-rotation sequence, the period in which the Vback is made smaller than the Vback during the image formation is provided. By this, the "shuddering" of the cleaning blade 101 is suppressed by supplying the fog toner to the cleaning portion B, and in addition, the "improper cleaning" due to that the toner slips through the cleaning blade 101 can be suppressed.

Particularly, in this embodiment, in the pre-rotation sequence and the post-rotation sequence, the amount of the fog toner supplied to the cleaning portion B is caused to gradually increase. By this, the "improper cleaning" due to that the toner slips through the cleaning blade 101 can be further suppressed.

Figure 11:
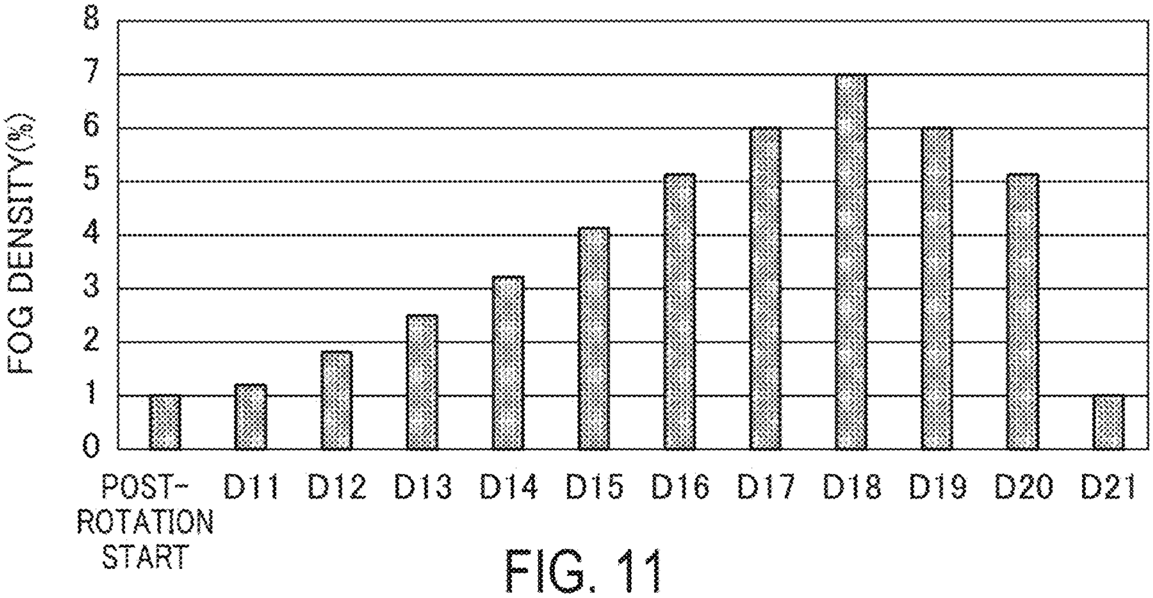
FIG. 11 is a graph showing a progression of the amount of the fog toner in the post-rotation sequence in the embodiment 1.

FIG. 10 is a graph showing a progression of a fog toner amount (fog density (%)) in the pre-rotation sequence in this embodiment. In FIG. 10, the fog toner amounts (fog densities (%)) at the time of the start of the pre-rotation sequence (application of the developing voltage DO) and at the time of application of the first to tenth developing voltages D1 to D10 are shown. Further, FIG. 11 is a graph showing a progression of a fog toner amount (fog density (%)) in the post-rotation sequence in this embodiment. In FIG. 11, the fog toner amounts (fog densities (%)) at the time of the start of the post-rotation sequence (application of the developing voltage D10) and at the time of application of the eleventh to twenty-first developing voltages D11 to D12 are shown.

In the pre-rotation sequence and the post-rotation sequence, by controlling the developing voltage and the surface potential of the photosensitive drum 1 as shown in FIGS. 6 and 8, respectively, the Vback can be gradually made small from 150 V which is the Vback during the image formation. By this, in the pre-rotation sequence and the post-rotation sequence, as shown in FIGS. 10 and 11, respectively, the amount of the fog toner of the normal charge polarity can be gradually increased from the state in which the fog toner amount becomes minimum.

As described above, when the predetermined toner pattern (solid black or thin line) is formed as the supplying operation in the state in which the frictional force between the photosensitive drum 1 and the cleaning blade 101 increases, a contact state of the free end of the cleaning blade 101 sometimes becomes unstable. On the other hand, in this embodiment, as the supplying operation, the period in which the Vback is made gradually smaller than the Vback during the image formation is provided. By this, as shown in FIGS. 10 and 11, the supply amount of the toner to the cleaning portion B can be gradually increased. As a result, it becomes possible to reduce a fluctuation in frictional force between the photosensitive drum 1 and the cleaning blade 101 during the supplying operation. For that reason, the contact state of the free end of the cleaning blade 101 to the photosensitive drum 1 does not readily become unstable. As a result, the "improper cleaning" due to that the toner itself supplied to the cleaning portion B during the supplying operation slips through the cleaning blade 101 can be further suppressed.

Incidentally, whether to make the Vback smaller than the Vback during the image formation to what degree can be appropriately set so that the "shuddering" can be sufficiently suppressed, on the basis of, for example, a length or the like of the above-described period in which the Vback is made smaller than the Vback during the image formation. For example, in the case where the Vback smaller than the Vback during the image formation by one stage, the length of the period can be made shorter with a smaller Vback. Further, in the case where Vbacks of a plurality of stages which are smaller than the Vback during the image formation are formed, the length of the period for each stage can be made shorter with a smaller Vback, and a sum of the lengths of the periods of all the stages can be made shorter with a larger ratio of smaller Vback stages to all the stages.

Although the present invention is not limited thereto, it is preferable that a period in which the Vback is 1/1.5 or less, preferably ½ or less, of the Vback during the image formation is provided. Incidentally, the Vback smaller than the Vback during the image formation may be 0 V. Further, as regards the fog toner amount, it is preferable that a period in which the fog density (%) is 3% or more, preferably 4% or more, is provided. By this, the length of the period in which the Vback is made smaller than the Vback during the image formation becomes long, so that a possibility of the influence on the productivity can be reduced. Incidentally, this fog density (%) is sufficient in many instances when the fog density (%) is 15% or less, typically 10% or less.

8. Effect Confirmation

Next, a result of an image output experiment in which an effect of this embodiment was confirmed will be described. The image output experiment was conducted for this embodiment (embodiment 1) and comparison examples 1 and 2.

Figure 12:
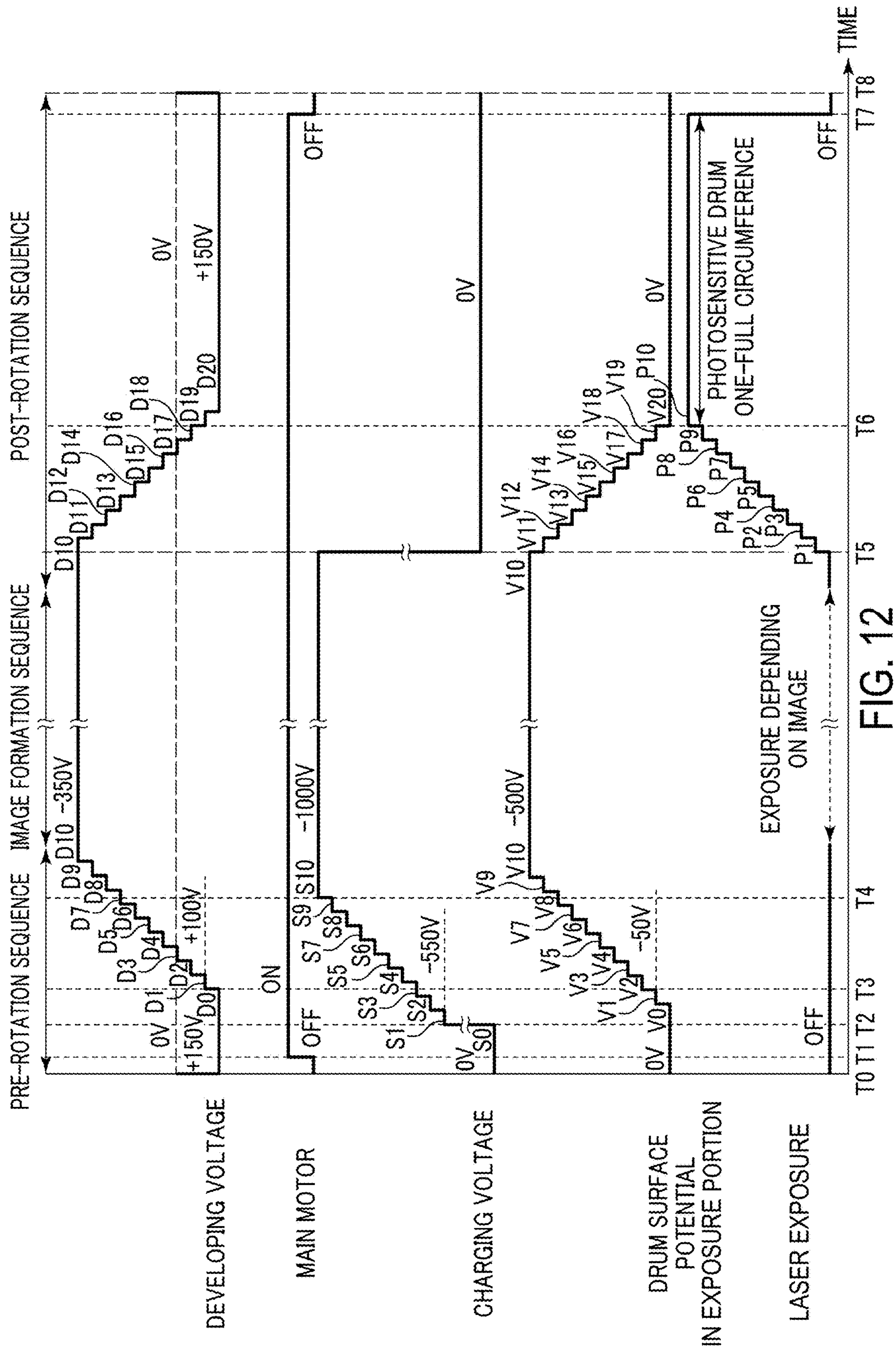
FIG. 12 is a timing chart of a print sequence in a comparison example 1.

The comparison example 1 is an example in which in the pre-rotation sequence and the post-rotation sequence, the Vback is made substantially constant at 150 V without making the Vback smaller than the Vback during the image formation. FIG. 12 is a timing chart of a print sequence in the comparison example 1. In the comparison example 1, in the pre-rotation sequence, the developing voltage is successively raised from +100 V which is the first developing voltage D1 at the time of the start (T3) of the stepwise rising control of the developing voltage to −350 V which is the tenth developing voltage D10 with a developing voltage fluctuation width per stage of 50 V in a manner such that the second developing voltage D2 is +50 V and the third developing voltage D3 is 0 V. That is, the fluctuation width per stage of the developing voltage is the same as the fluctuation width per stage of the charging voltage. By this, the Vback in the pre-rotation sequence is kept substantially constant at 150 V. Further, in the comparison example 1, in the post-rotation sequence, the developing voltage is successively caused to fall from −350 V which is the tenth developing voltage D10 at the time of the start (T5) of the stepwise rising control of the developing voltage to +150 V which is the twentieth developing voltage D20 with a developing voltage fluctuation width per stage of 50 V in a manner such that the eleventh developing voltage D11 is −300 V and the twelfth developing voltage D12 is −250 V. That is, the fluctuation width per stage of the developing voltage is the same as the fluctuation width per stage of the surface potential of the photosensitive drum 1 by the laser exposure. By this, the Vback in the post-rotation sequence is kept substantially constant at 150 V.

Figure 13:
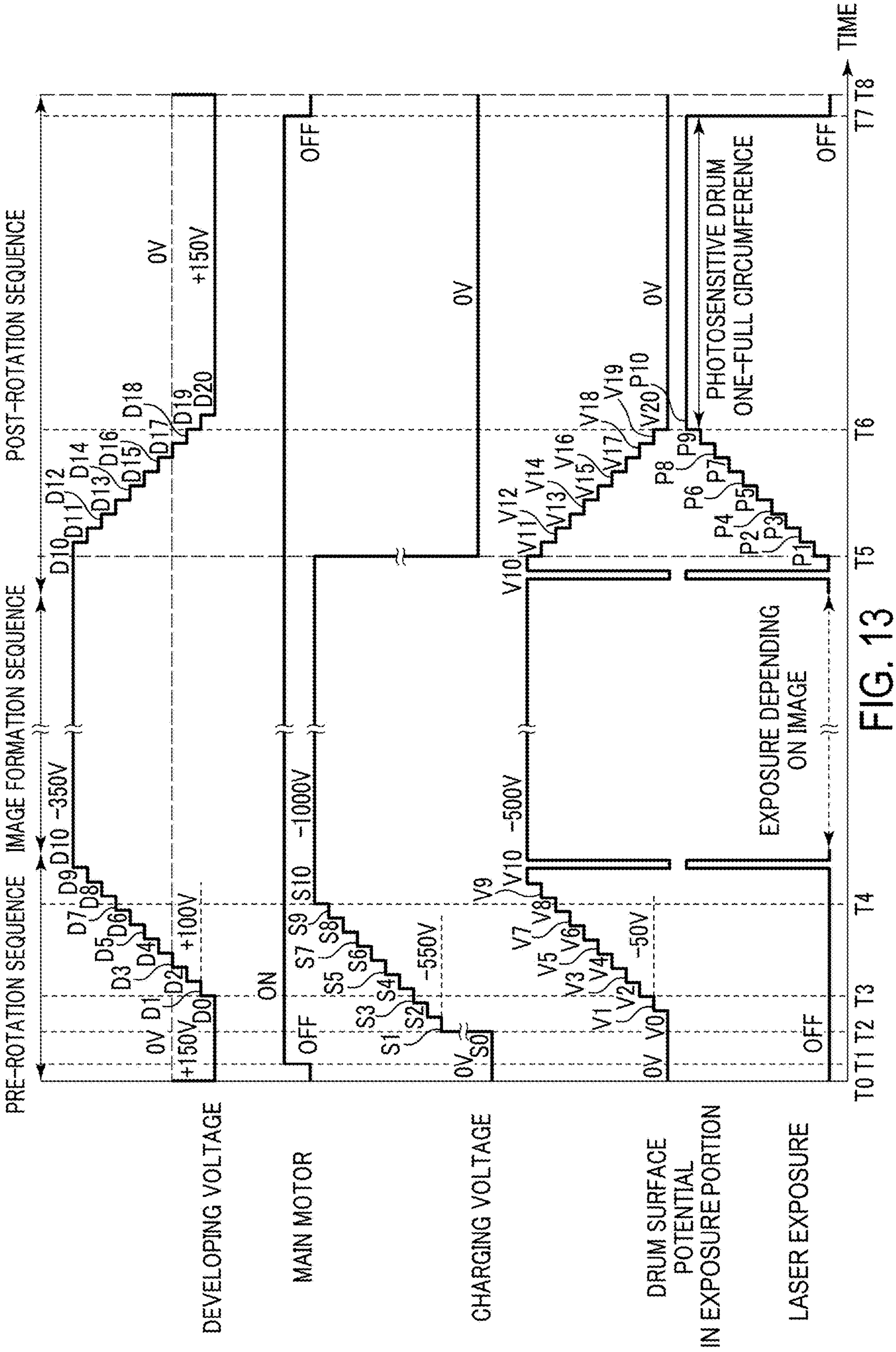
FIG. 13 is a timing chart of a print sequence in a comparison example 2.

Further, in the comparison example 2, similarly as in the comparison example 1, in the pre-rotation sequence and the post-rotation sequence, the Vback was made substantially constant at 150 V without making the Vback smaller than the Vback during the image formation. Further, in the comparison example 2, in the pre-rotation sequence and the post-rotation sequence, the supplying operation for forming the predetermined toner pattern is performed. In this supplying operation, as the predetermined toner pattern, a band-like solid black image is formed over a substantially whole area of the image formable region in a rotational axis direction of the photosensitive drum 1. FIG. 13 is a timing chart of a print sequence in the comparison example 2. In the comparison example 2, in the pre-rotation sequence, the stepwise rising control of the charging voltage is carried out, and the surface potential of the photosensitive drum 1 in the exposure portion E is raised to −500 V which is a tenth surface potential V10, and thereafter, exposure at an exposure amount (corresponding to the above-described tenth exposure amount) is carried out, so that the solid black image is formed. Further, similarly, also in the post-rotation sequence, the exposure at the exposure amount P10 is carried out, so that the solid black image is formed. Incidentally, a width (exposure time) of the solid black image in a surface movement direction of the photosensitive drum 1 was adjusted so that the toner in an amount which is substantially the same as the fog toner amount in the supplying operation in this embodiment.

Incidentally, constitutions and operations of the image forming apparatuses 100 of the comparison examples 1 and 2 are substantially the same as those of the image forming apparatus 100 of this embodiment except for the above-described differences.

For the image forming apparatuses 100 of this embodiment (embodiment 1) and the comparison examples 1 and 2, an image output experiment (durability test of 30 k sheets) was conducted, and occurrence or non-occurrence of each of the "shuddering" and the "improper cleaning" during execution of the image output experiment was checked. The "shuddering" was evaluated by checking occurrence or non-occurrence of noise due to the "shuddering". Further, the "improper cleaning" was evaluated by checking occurrence or non-occurrence of the toner passed (slipped) through the cleaning blade 101. A result is shown in a table 1.

TABLE 1

| | STA*[1] | SHUDDERING | IC*[2] |
|---|---|---|---|
| COMP.EX. 1 | 0 mg | OCCURRED | OCCURRED (5K) |
| COMP.EX. 2 | 6 mg | NOT OCCURRED | OCCURRED (15 k) |
| EMB. 2 | 6 mg | NOT OCCURRED | NOT OCCURRED |

*[1]"STA" is the supply toner amount during supply.
*[2]"IC" is the improper cleaning. "(5 k)" shows that the improper cleaning occurred at 5,000 sheets. "(15 k)" shows that the improper cleaning occurred at 15,000 sheets.

In the comparison example 1, the shuddering occurred, but in the comparison example 2, the shuddering did not occur. This would be considered because in the comparison example 2, the supplying operation in which the predetermined toner pattern was formed and the toner was supplied to the cleaning portion B during non-image formation was performed. On the other hand, in the comparison example 1, the improper cleaning occurred at 5 k sheets, and in the comparison example 2, the improper cleaning occurred at 15 k sheets although a life-extending effect was achieved. This would be considered because in the comparison example 2, the toner itself of the toner pattern slipped through the cleaning blade 101 during the supplying operation. That is, in the comparison example 2, as the supplying operation, the predetermined toner pattern was formed by a step similar to the step during normal image formation in which the toner is transferred onto the recording material S. For that reason, it would be considered that the contact state of the free end of the cleaning blade 101 with the photosensitive drum 1 becomes unstable due to a fluctuation in frictional force between the photosensitive drum 1 and the cleaning blade 101 during the supplying operation.

On the other hand, in this embodiment (embodiment 1), the shuddering and the improper cleaning did not occur. This would be considered because the shuttering was able to be suppressed by providing the period in which the Vback is made smaller than the Vback during the image formation and then by supplying the fog toner to the cleaning portion B as the supplying operation. Further, as regards the fog toner, the slip of the toner itself through the cleaning blade 101 does not readily occur due to a relatively small electric charge or the like as described above, and therefore, it would be considered that the improper cleaning during the supplying operation also did not occur. Further, in this embodiment, the Vback was made gradually smaller than the Vback during the image formation in the supplying operation, so that the supply amount of the fog toner to the cleaning portion B was gradually increased. By this, the fluctuation in frictional force between the photosensitive drum 1 and the cleaning blade 101 is made small, so that it is possible to suppress that the contact state of the free end of the cleaning blade 101 with the photosensitive drum 1 becomes unstable. For that reason, it would be considered that the improper cleaning during the supplying operation could be further suppressed.

Thus, in this embodiment, the image forming apparatus 100 includes the rotatable image bearing member (photosensitive drum 1); the charging device (charging roller) 2 for electrically charging a surface of the image bearing member 1; the charging voltage applying portion (charging power source) 11 for applying a charging voltage to the charging device 2; the exposure device 3 for forming the electrostatic image on the surface of the image bearing member 1 by exposing, to light, the surface of the image bearing member charged by the charging device 2; the developing member (developing roller) 42 rotatable while carrying toner and for forming the toner image on the surface of the image bearing member 1 by forming the developing portion G in contact with the surface of the image bearing member 1 and then by supplying the toner to the electrostatic image on the surface of the image bearing member 1 at the developing portion G; the developing voltage applying portion (developing power source) 50 for applying a developing voltage to the developing member 42; a cleaning member (cleaning blade) 101 forming the cleaning portion B in contact with the surface of the image bearing member 1 and configured to remove the toner from the surface of the image bearing member 1; and the controller (engine controller) 205 for controlling at least one of the charging voltage applying portion 11, the developing voltage applying portion 50, and the exposure device 3 so as to form a Vback which is potential difference between a surface potential of the image bearing member 1 charged by the charging device 2 and the developing voltage applied to the developing member 42 at the developing portion G and which is a potential difference such that the surface potential is higher than the developing voltage on a side where a polarity thereof is the same as the normal charge polarity of the toner, wherein the controller carries out control so as to execute the image forming operation for forming the toner image on the surface of the image bearing member 1 and the non-image forming operation not for forming the toner image on the surface of the image bearing member 1.

Further, in this embodiment, during the non-image forming operation from a start of rotation of the image bearing member 1 to a start of the image forming operation or the non-image forming operation from an end of the image forming operation to a stop of the rotation of the image bearing member 1, in a state in which the developing member 42 rotates in contact with the image bearing member 1, the controller 205 carries out control so as to execute the supplying operation in which the Vback smaller than the Vback during the image forming operation is formed in a time corresponding to at least one full rotation of the developing member 42 and the toner moved from the developing member 42 to the surface of the image bearing member 1 is supplied to the cleaning portion B.

In this embodiment, during the non-image formation from a start of rotation of the image bearing member 1 to a start of the image forming operation, the controller changes an absolute value of the surface potential of the image bearing member 1 from a value during a stop of the rotation of the image bearing member to a value during image formation, and in addition, in at least a part of a period when an absolute value of the developing voltage is changed from a value during the stop of the rotation of the image bearing member to a value during the image forming operation, as the supplying operation, the controller changes the Vback to a first value smaller than the Vback during the image forming operation and to a second value smaller than the first value.

At this time, in this embodiment, particularly, during the non-image formation from a start of rotation of the image bearing member 1 to a start of the image forming operation, the controller changes stepwise an absolute value of the surface potential of the image bearing member 1, and in addition in at least a part of a period when an absolute value of the developing voltage is changed stepwise, the controller makes the Vback stepwise smaller than the Vback during the image forming operation.

Further, at this time, the controller 205 carries out control so as to stepwise change the Vback by changing at least one of a change width per stage when the absolute value of the surface potential of the image bearing member 1 is changed stepwise and a change width per stage when the absolute value of the developing voltage is changed stepwise.

Further, during the non-image formation from an end of the image forming apparatus to a stop of rotation of the image bearing member 1, the controller changes an absolute value of the surface potential of the image bearing member 1 from a value during image formation to a value during a stop of the rotation of the image bearing member and in addition, in at least a part of a period when an absolute value of the developing voltage is changed from a value during the image forming operation to a value during the stop of the rotation of the image bearing member as the supplying operation, the controller changes the Vback to a first value smaller than the Vback during the image forming operation and to a second value smaller than the first value.

At this time, in this embodiment, particularly, during the non-image formation from an end of the image forming apparatus to a stop of rotation of the image bearing member 1, the controller changes stepwise an absolute value of the surface potential of the image bearing member 1, and in addition in at least a part of a period when an absolute value of the developing voltage is changed stepwise, the controller makes the Vback stepwise smaller than the Vback during the image forming operation.

Further, at this time, in this embodiment, the controller 205 carries out control so as to stepwise change the Vback by changing at least one of a change width per stage when the absolute value of the surface potential of the image bearing member 1 is changed stepwise and a change width per stage when the absolute value of the developing voltage is changed stepwise.

As described above, according to this embodiment, the frictional force between the photosensitive drum 1 and the cleaning blade 101 is reduced by supplying the toner to the cleaning portion B during the non-image formation, and in addition, it is possible to suppress the occurrence of the improper cleaning due to that the toner slips through the cleaning blade 101.

Next, another embodiment (embodiment 2) of the present invention will be described. Basic constitution and operation of an image forming apparatus of this embodiment are the same as those of the image forming apparatus of the embodiment 1. Accordingly, in the image forming apparatus of this embodiment, as regards elements having the same or corresponding functions or constitutions as those of the image forming apparatus of the embodiment 1, detailed description will be omitted by adding thereto the same reference numerals or symbols as those in the embodiment 1.

1. Summary of this Embodiment

In this embodiment, during the non-image formation, by carrying out control in which the Vback is made larger than the Vback during the image formation, the fog toner principally comprising deteriorated toner is supplied to the cleaning portion B ("supplying operation"). By this, not only the "shuddering" and "improper cleaning" are suppressed similarly as in the embodiment 1, but also it becomes possible to suppress an occurrence of a fog (fog during the image formation) on the non-image portion of a printed matter by reducing accumulation of the deteriorated toner in the neighborhood of the developing roller 42.

2. Print Sequence

Next, the print sequence (print operation, job) in this embodiment (embodiment 1) will be described.

Figure 14:
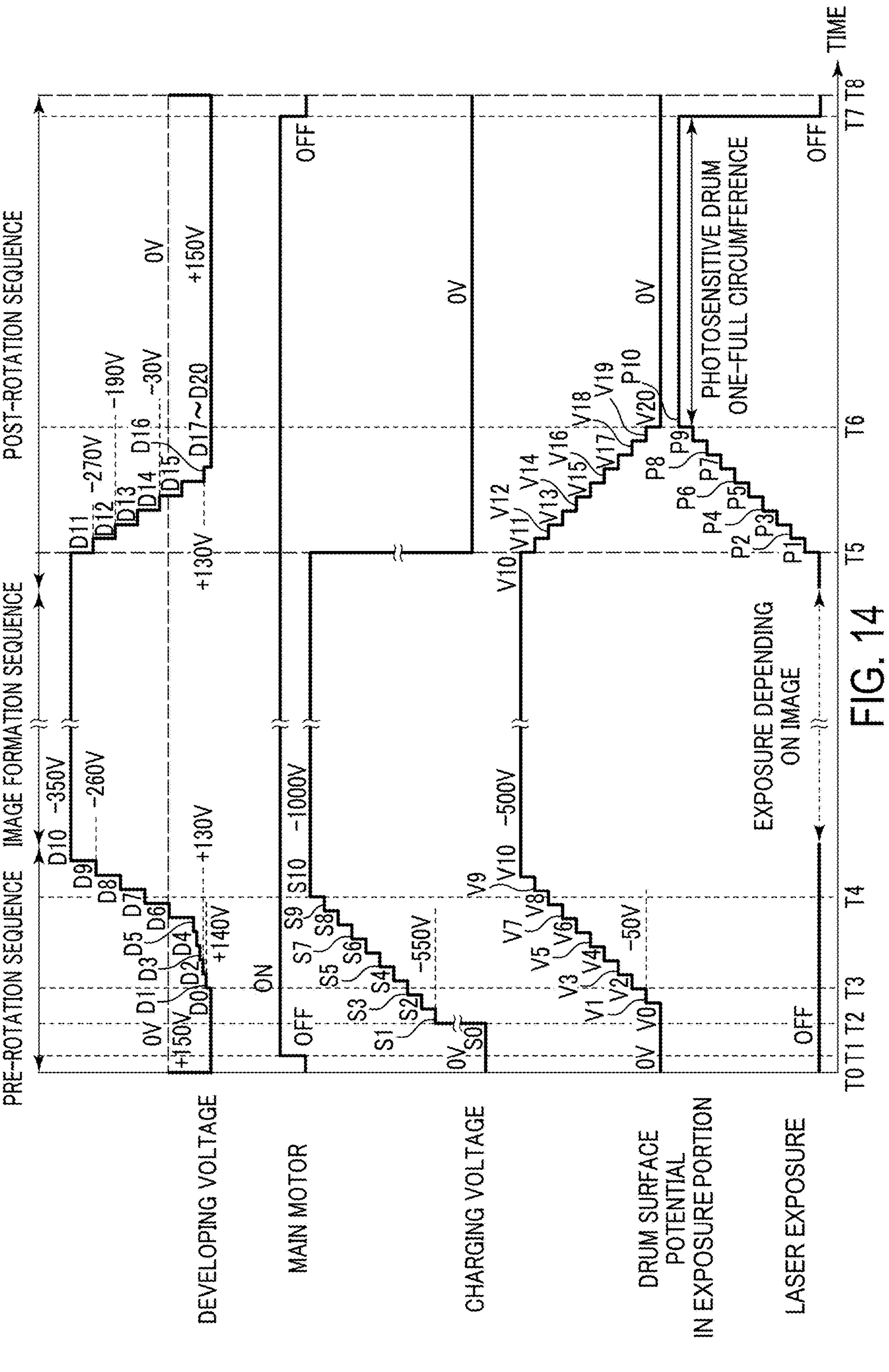
FIG. 14 is a timing chart of a print sequence in an embodiment 2.

FIG. 14 is a timing chart showing a print sequence in this embodiment. In FIG. 14, progressions of the developing voltage, the charging voltage, operations of the main motor 10 and the exposure device 3 (laser exposure), and the surface potential of the photosensitive drum 1 in the print sequence are shown. Operations described below in the print sequence are controlled by the engine controller 205.

Control of the charging voltage (surface potential of the photosensitive drum 1) in the pre-rotation sequence and the post-rotation sequence in this embodiment is similar to the control in the embodiment 1.

In this embodiment, in the pre-rotation sequence, the developing voltage is controlled so that the Vback gradually becomes large from 150 V which is Vback during the image formation. That is, correspondingly to the stepwise rising control of the charging voltage (surface potential of the photosensitive drum 1), the developing voltage is raised in the step form (stepwise) so that the Vback gradually becomes large from 150 V which is the Vback during the image formation. In this embodiment, the developing voltage is successively raised up to +100 V which is a fifth developing voltage D5 with a fluctuation width per stage of the developing voltage of 10 V in a manner such that a first developing voltage D1 at a time (T3) of a start of the stepwise rising control of the developing voltage is +140 V and then a second developing voltage D2 is +130 V. Thereafter, the fluctuation width of the developing voltage is changed to 90 V, and thus the developing voltage is raised up to −350 V which is a tenth developing voltage D10 in a manner such that a sixth developing graph D6 is +10 V and a seventh developing voltage D7 is −80 V. Thus, the developing voltage is switched and raised in the step form (stepwise) every 30 ms from the first developing voltage D1 to the tenth developing voltage D10. Incidentally, a developing voltage (+150 V) from the timing T0 when the pre-rotation sequence is started to the timing T3 when the stepwise rising control of the developing voltage is started is DO.

Figure 15:
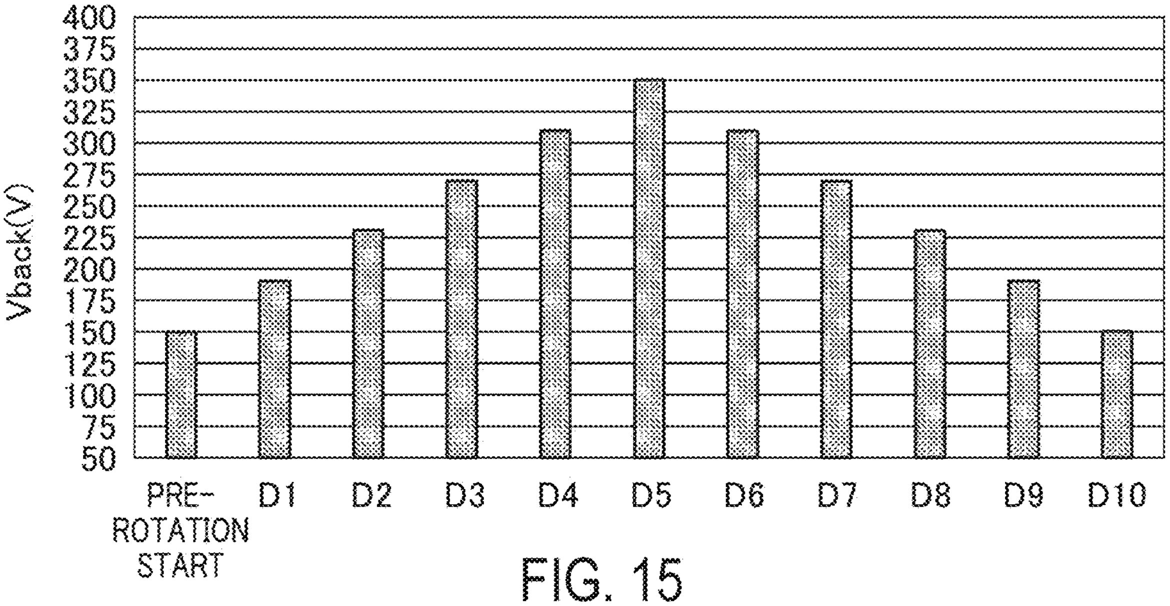
FIG. 15 is a graph showing a progression of Vback in a pre-rotation sequence in the embodiment 2.

FIG. 15 is a graph showing a progression of the Vback in the pre-rotation sequence in this embodiment. In FIG. 15, values of the Vback at the time of the start of the pre-rotation sequence (during application of the developing voltage DO) and during application of the first to tenth developing voltages D1 to D10, respectively, are shown. As shown in FIG. 15, in this embodiment, by controlling the developing voltage and the surface potential of the photosensitive drum 1 in the above-described manners, the Vback can be gradually made large from 150 V which is the Vback during the image formation in the pre-rotation sequence. Incidentally, in this embodiment, from the fifth developing voltage D5 to the tenth developing voltage D10, the Vback is gradually made small toward the Vback during the image formation.

Further, also in this embodiment, in the post-rotation sequence, similarly as in the pre-rotation sequence, control in which the developing voltage is switched in the step form (stepwise) (the stepwise falling control) is carried out. In this embodiment, the developing voltage is controlled so that the Vback gradually becomes large from 150 V which is Vback during the image formation. That is, correspondingly to the stepwise falling control of the surface potential of the photosensitive drum 1, the developing voltage is caused to fall in the step form (stepwise) so that the Vback gradually becomes large from 150 V which is the Vback during the image formation. In this embodiment, the developing voltage is successively caused to fall to +130 V which is a sixteenth developing voltage D16 with a fluctuation width per stage of the developing voltage of 80 V in a manner such that the developing voltage is caused to fall from −350 V which is tenth developing voltage D10 at a time (T5) of a start of the stepwise falling control of the developing voltage, to an eleventh developing voltage D11 of −270 V and then to a twelfth developing voltage D12 of −190 V. Thereafter, the fluctuation width of the developing voltage is changed to 20 V, and then the developing voltage is caused to fall to +150 V which is the same from a seventeenth developing voltage D17 to a twentieth developing voltage D20. Thus, the developing voltage is switched and caused to fall in the step form (stepwise) every 30 ms from the tenth developing voltage D10 to the seventeenth developing voltage D17 (the twentieth developing voltage D20).

Figure 16:
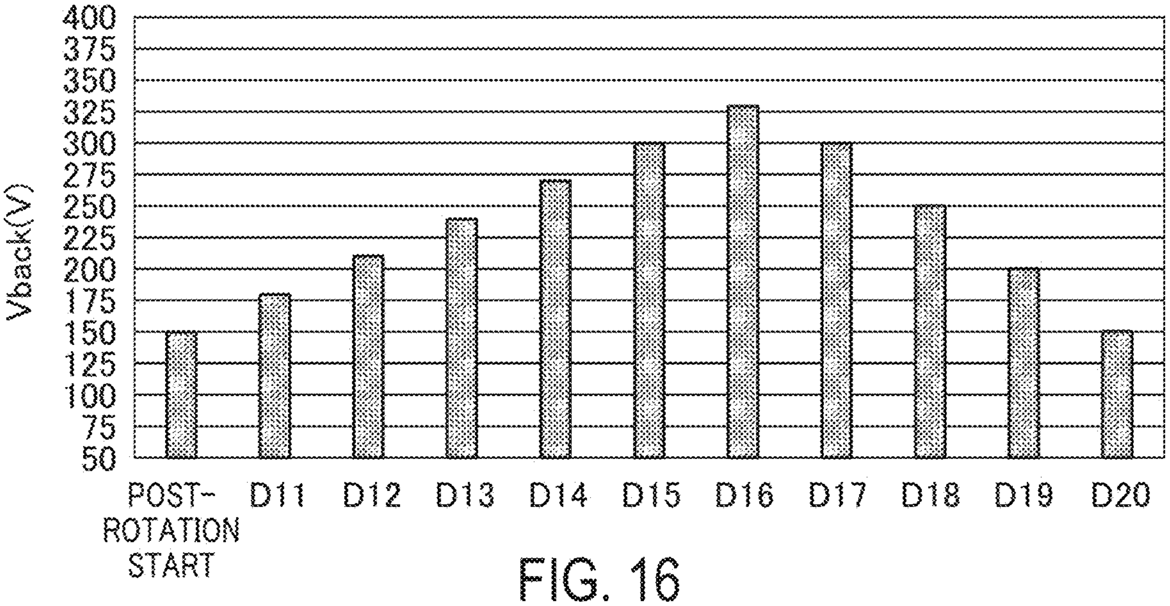
FIG. 16 is a graph showing a progression of Vback in a post-rotation sequence in the embodiment 2.

FIG. 16 is a graph showing a progression of the Vback in the post-rotation sequence in this embodiment. In FIG. 16, values of the Vback at the time of the start of the post-rotation sequence (during application of the developing voltage D10) and during application of the eleventh to twentieth developing voltages D10 to D20, respectively, are shown. As shown in FIG. 16, in this embodiment, by controlling the developing voltage and the surface potential of the photosensitive drum 1 in the above-described manners, the Vback can be gradually made large from 150 V which is the Vback during the image formation also in the post-rotation sequence. Incidentally, in this embodiment, from the sixteenth developing voltage D16 to the twentieth developing voltage D20, the Vback is gradually made small toward the Vback at the time of a stop of rotation of the photosensitive drum 1.

3. Effect

Next, an effect of this embodiment will be described.

As described in the embodiment 1, there is an optimum value for the Vback, and a minimum value of the amount of the fog toner cannot be obtained even when the Vback is excessively small or excessively large. In general, during the image formation, the Vback is set so that the fog toner amount becomes minimum (FIG. 9).

In this embodiment, in the pre-rotation sequence and the post-rotation sequence, a period (time zone) in which the Vback is made larger than the Vback during the image formation is provided. By this, in the pre-rotation sequence and the post-rotation sequence, it is possible to provide a period in which the fog toner of an opposite polarity (hereinafter, also referred to as a "reverse polarity") to the normal charge polarity generates. Then, by supplying the thus generated fog toner to the cleaning portion B, the toner and an external additive can be stagnated at a free end of the cleaning blade 101 on a free end portion side. By this, a lubricating property is imparted between the photosensitive drum 1 and the cleaning blade 101, so that the "shuddering" of the cleaning blade 101 can be suppressed.

Figure 17:
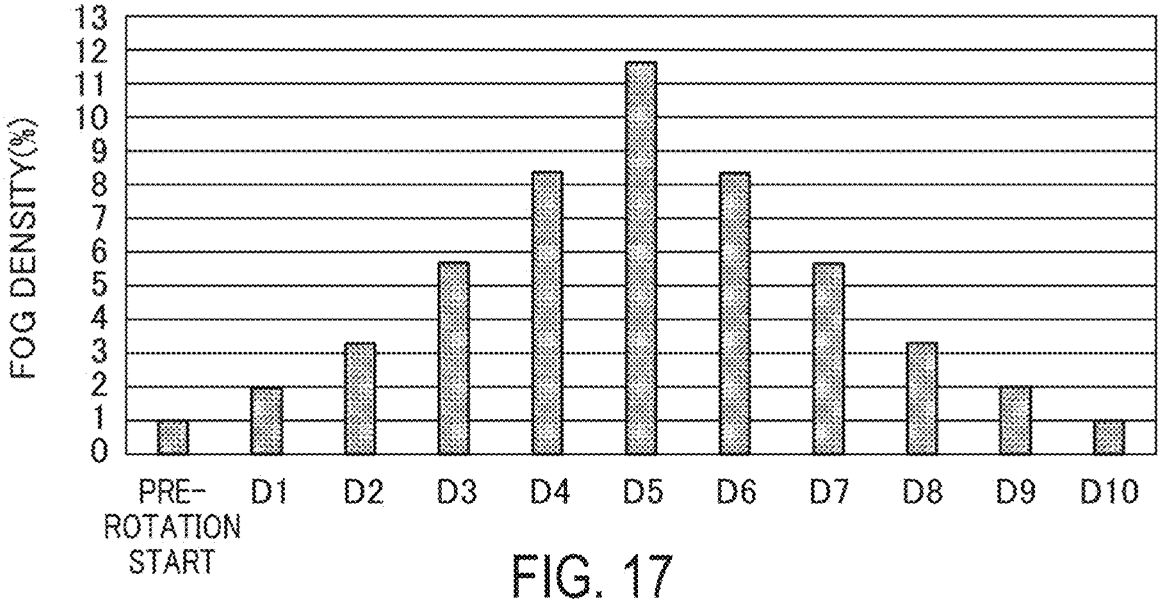
FIG. 17 is a graph showing a progression of an amount of fog toner in the pre-rotation sequence in the embodiment 2.

Here, the period in which the Vback is made larger than the Vback during the image formation is made not less than a time corresponding to one full rotation of the developing roller 42, similarly as the period in which the Vback is made smaller than the Vback during the image formation in the embodiment 1. Particularly, it is preferable that a period in which the fog density (%) becomes 3% or more by making the Vback larger than the Vback during the image formation is not less than the time corresponding to the one full rotation of the developing roller 42. Incidentally, a length of the period in which the Vback is made larger than the Vback during the image formation is, in the case where a plurality of periods each in which the Vback is made larger than the Vback during the image formation, a length which is a sum of these periods. In this embodiment, the time corresponding to the one full rotation of the developing roller 42 is about 103 ms (outer diameter: 11.5 mm, peripheral speed: 350 mm/s). Further, in this embodiment, in the pre-rotation sequence, the period in which the Vback is made larger than the Vback during the image formation is 270 ms which is the time of application of the first to ninth developing voltages D1 to D9 (FIG. 15). Particularly, the period in which the fog density (%) becomes 3% or more is 210 ms which is the time of application of the second to eighth developing voltages D2 to D8 as described later (FIG. 17). Further, in this embodiment, in the post-rotation sequence, the period in which the Vback is made larger than the Vback during the image formation is 300 ms at the time of application of the eleventh to nineteenth developing voltages D11 to D19 (FIG. 16). Particularly, the period in which the fog density (%) becomes 3% or more is 180 ms which is the time of application of the thirteenth to eighteenth developing voltages D13 to D18. In the case where the period in which the Vback is made larger than the Vback during the image formation is excessively short, it becomes difficult to supply, to the cleaning portion B, the fog toner in an amount enough to suppress the "shuddering". Further, in the case where the period in which the Vback is made larger than the Vback during the image formation is excessively short, for the reason that it is difficult to transfer, onto the photosensitive drum 1, the deteriorated toner of the toner coated on the developing roller 42 over a full circumference of the developing roller 42 or for the like reason, it becomes difficult to obtain an effect of suppressing accumulation of the deteriorated toner (described later). On the other hand, when the period in which the Vback is made larger than the Vback during the image formation is made excessively long, there is a possibility that the excessively long period has the influence on productivity similarly as in the period in which the Vback is made smaller than the Vback during the image formation in the embodiment 1. Although the above-described period is not limited thereto, the period in which the Vback is made larger than the Vback during the image formation is enough in many instances when the period is not more than a time corresponding to 10 full rotations (typically 5 full rotations) of the developing roller 42, and further, this may also be preferable from a viewpoint of suppressing the influence on the productivity.

Here, as described in the embodiment 1, in the state in which the frictional force between the photosensitive drum 1 and the cleaning blade 101 increases, as a supplying operation, when a predetermined toner pattern (solid black or thin line) is formed, the contact state of the free end of the cleaning blade 101 to the photosensitive drum 1 becomes unstable in some instances.

On the other hand, the fog toner generating in the case where the Vback is larger than the Vback in a state in which the fog toner amount becomes minimum principally comprises the deteriorated toner as described later and has a tendency that an absolute value of the electric charge is relatively small and that a mirror force with the photosensitive drum 1 is relatively low is large in amount. For that reason, as the supplying operation, by supplying the fog toner of the normal charge polarity to the cleaning portion B after the period in which the Vback is made larger than the Vback during the image formation is provided, so that the slip of the toner itself, supplied to the cleaning portion B during the supplying operation, through the cleaning blade 101 does not readily occur.

Further, similarly as in the embodiment 1, as an effect other than the above-described effect, such an effect that the toner supply amount can be gradually increased and thus the supplying operation in which the fluctuation in frictional force is made small becomes possible, and a contact state of the free end of the cleaning blade 101 does not readily become unstable can be obtained. Further, the period in which the Vback is made larger than the Vback during the image formation is made not less than the time corresponding to one full rotation of the developing roller 42, whereby in a section which is the latter-half section of this period in which the toner supply amount becomes large, a tendency that the toner larger in particle size is supplied to the cleaning portion can be shown. For that reason, even when the toner supply amount is large, the slip of the toner itself through the cleaning blade 101 does not readily occur, so that a higher effect can be obtained.

Further, similarly as described in the embodiment 1, in this embodiment, at the time of the start of the rotation of the developing roller 42, the Vback is set to the same value as the Vback during the image formation. Then, the rotation of the developing roller 42 is made, and the Vback is changed after a timing when the toner on the developing roller 42 passed through the contact portion with the developing blade 44 reaches the developing portion G. However, particularly, in a condition that the charge amount of the toner is stable, the Vback at the time of the start of the rotation of the developing roller 42 is not limited to the Vback in this embodiment, but the Vback may also be made larger than the Vback during the image formation from the initial stage.

Thus, in this embodiment, in the pre-rotation sequence and the post-rotation sequence, the period in which the Vback is made larger than the Vback during the image formation is provided. By this, the "shuddering" of the cleaning blade 101 is suppressed by supplying the fog toner to the cleaning portion B, and in addition, the "improper cleaning" due to that the toner slips through the cleaning blade 101 can be suppressed.

Particularly, in this embodiment, in the pre-rotation sequence and the post-rotation sequence, the amount of the fog toner supplied to the cleaning portion B is caused to gradually increase. By this, the "improper cleaning" due to that the toner slips through the cleaning blade 101 can be further suppressed.

FIG. 17 is a graph showing a progression of a fog toner amount (fog density (%)) in the pre-rotation sequence in this embodiment. In FIG. 17, the fog toner amounts (fog densities (%)) at the time of the start of the pre-rotation sequence (application of the developing voltage DO) and at the time of application of the first to tenth developing voltages D1 to D10 are shown.

Figure 18:
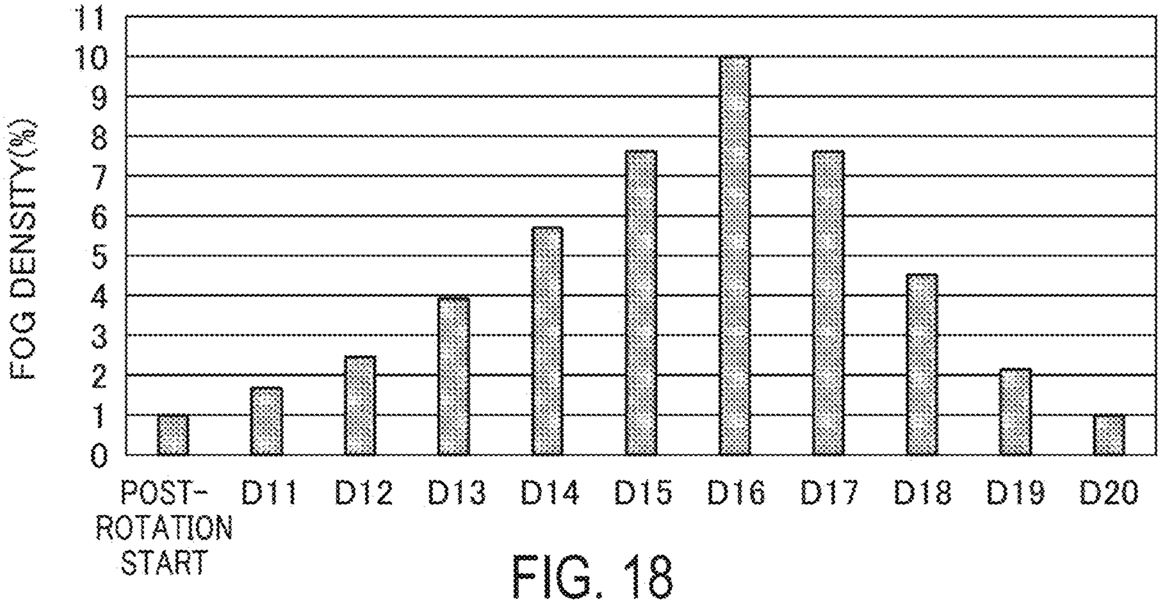
FIG. 18 is a graph showing a progression of the amount of the fog toner in the post-rotation sequence in the embodiment 2.

Further, FIG. 18 is a graph showing a progression of a fog toner amount (fog density (%)) in the post-rotation sequence in this embodiment. In FIG. 18, the fog toner amounts (fog densities (%)) at the time of the start of the post-rotation sequence (application of the developing voltage D10) and at the time of application of the eleventh to twentieth developing voltages D11 to D20 are shown.

In the pre-rotation sequence and the post-rotation sequence, by controlling the developing voltage and the surface potential of the photosensitive drum 1 as shown in FIGS. 15 and 16, respectively, the Vback can be gradually made large from 150 V which is the Vback during the image formation. By this, in the pre-rotation sequence and the post-rotation sequence, as shown in FIGS. 17 and 18, respectively, the amount of the fog toner of the reverse polarity can be gradually increased from the state in which the fog toner amount becomes minimum.

As described above, when the predetermined toner pattern (solid black or thin line) is formed as the supplying operation in the state in which the frictional force between the photosensitive drum 1 and the cleaning blade 101 increases, a contact state of the free end of the cleaning blade 101 sometimes becomes unstable. On the other hand, in this embodiment, as the supplying operation, the period in which the Vback is made gradually larger than the Vback during the image formation is provided. By this, as shown in FIGS. 17 and 18, the supply amount of the toner to the cleaning portion B can be gradually increased. As a result, it becomes possible to reduce a fluctuation in frictional force between the photosensitive drum 1 and the cleaning blade 101 during the supplying operation. For that reason, the contact state of the free end of the cleaning blade 101 to the photosensitive drum 1 does not readily become unstable. As a result, the "improper cleaning" due to that the toner itself supplied to the cleaning portion B during the supplying operation slips through the cleaning blade 101 can be further suppressed.

Further, in this embodiment, as the supplying operation, the fog toner of the reverse polarity is supplied to the cleaning portion B, whereby different from the case where the fog toner of the normal charge polarity is supplied to the cleaning portion B, the following effect is obtained.

That is, the fog toner of the reverse polarity is toner which is not readily charged to the normal charge polarity. Most of this fog toner of the reverse polarity is toner deteriorated with repetition of the print operation. The deterioration of the toner is caused by transfer or burying of the external additive of the toner, deformation of a shape of the toner, and the like. For that reason, in the supplying operation, by increasing an amount of the fog toner of the reverse polarity, the deteriorated toner is selectively discharged from the developing device 4 and can be collected in the cleaning device 6. By repetitively performing this operation in the pre-rotation sequence and the post-rotation sequence, with the result that accumulation of the deteriorated toner, which is not readily charged to the normal charge polarity, in the neighborhood of the developing roller 42 is reduced, so that an effect such that occurrence of the fog (fog during the image formation) on the non-image portion of the printed matter is suppressed can be obtained.

Further, the toner deteriorated due to the transfer or the burying of the external additive of the toner or the deformation of the shape of the toner, or the like lowers in flowability thereof. By this, stress exerted on the toner is liable to increase, so that the above-described phenomenon is liable to cumulatively advance in such a manner that the transfer or the burying of the external additive of the toner or the deformation of the shape of the toner is caused. For that reason, in the supplying operation, the amount of the fog toner of the reverse polarity is increased, and the deteriorated toner is selectively discharged from the developing device 4, so that as described above, it is possible to suppress that the transfer or the burying of the external additive of the toner or the deformation of the shape of the toner cumulatively advances. When the external additive of the toner is transferred in many instances, the developing roller 42 is contaminated with the external additive, so that a stripe-shaped image defect (for example, extending in a direction along the surface movement direction of the developing roller 42) (hereinafter, also referred to as a "development stripe") is liable to occur. In the supplying operation, the amount of the reverse polarity is increased and the deteriorated toner is selectively discharged from the developing device 4, so that such an effect of suppressing this phenomenon is also obtained.

Further, similarly as described in the embodiment 1, whether to make the Vback larger than the Vback during the image formation to what degree can be appropriately set so that the "shuddering" and the "fog during the image formation" can be sufficiently suppressed, on the basis of, for example, a length or the like of the above-described period in which the Vback is made larger than the Vback during the image formation. For example, in the case where the Vback larger than the Vback during the image formation by one stage, the length of the period can be made shorter with a larger Vback. Further, in the case where Vbacks of a plurality of stages which are larger than the Vback during the image formation are formed, the length of the period for each stage can be made shorter with a larger Vback, and a sum of the lengths of the periods of all the stages can be made shorter with a larger ratio of larger Vback stages to all the stages. Although the present invention is not limited thereto, it is preferable that a period in which the Vback is 1.5 times or more, preferably ½ times or more, the Vback during the image formation is provided. Incidentally, the Vback larger than the Vback during the image formation is enough in many instances when this Vback is 3 times or less, typically 2.5 times or less, the Vback during the image formation. Further, as regards the fog toner amount, it is preferable that a period in which the fog density (%) is 3% or more, preferably 4% or more, is provided. By this, the length of the period in which the Vback is made larger than the Vback during the image formation becomes long, so that a possibility of the influence on the productivity can be reduced. Incidentally, this fog density (%) is sufficient in many instances when the fog density (%) is 15% or less, typically 10% or less.

4. Effect Confirmation

Next, a result of an image output experiment in which an effect of this embodiment was confirmed will be described. The image output experiment was conducted for this embodiment (embodiment 1) and comparison examples 1 and 2. The comparison examples 1 and 2 are the same as those described in the embodiment 1, and the operations of the print sequences in the comparison examples 1 and 2 are as shown in FIGS. 12 and 13, respectively.

For the image forming apparatuses 100 of this embodiment (embodiment 2) and the comparison examples 1 and 2, an image output experiment (durability test of 30 k sheets) was conducted, and occurrence or non-occurrence of each of the "fog" and the "development stripe" was checked. The "fog" was measured in the following manner by using a reflection density meter ("TC-6DS/A30", manufactured by Tokyo Denshoku Co., Ltd.).

An image with a white portion is outputted on predetermined paper, and a measured value (average reflectance, degree of whiteness) of a reflection density of the white portion of the outputted image is taken as Ds (%), and the reflection density (average reflectance, degree of whiteness) of the predetermined paper is taken as Dr (%). Then, from a difference between Ds (%) and Dr (%), a fog density (%) (=Dr (%)−Ds (%)) was calculated. The "fog" was evaluated at the time when the image output experiment was ended. Incidentally, the fog during the image formation is out of an allowable range when the fog exceeds 3%. Further, the "development stripe" was evaluated by outputting a halftone image at a point of time every 1 k (1000) sheets during execution of the image output experiment and then by checking occurrence or non-occurrence of the stripe. A result is shown in a table 2.

TABLE 2

| | STA*[1] | FOG | DS*[2] |
|---|---|---|---|
| COMP.EX. 1 | 0 mg | 7.5% | OCCURRED (20K) |
| COMP.EX. 2 | 6 mg | 7.2% | OCCURRED (20 k) |
| EMB. 2 | 6 mg | 1.5% | NOT OCCURRED |

*[1]"STA" is the supply toner amount during supply.
*[2]"DS" is the development stripe. (20 k) shows that the development stripe occurred from 20,000 sheets.

In the comparison example 1 and 2, the fog occurred at a level exceeding 7%, and the development stripe also occurred.

On the other hand, in this embodiment, the fog was 1.5% which is within the allowable range, and the development stripe also did not occur. In this embodiment, the amount of the fog toner of the reverse polarity is increased by providing the period in which the Vback is made larger than the Vback during the image formation, so that the deteriorated toner is selectively discharged from the developing device 4 and is collected in the cleaning device 6. By this, it would be considered that the occurrence of the fog (fog during the image formation) on the non-image portion of the printed matter was able to be suppressed by reducing accumulation of the deteriorated toner, which is not readily charged to the normal charge polarity, in the neighborhood of the developing roller 42. Further, it would be considered that occurrence of the development stripe was also able to be suppressed the suppressing the transfer of the external additive of the toner.

Incidentally, it turned out that by the image output experiment similar to that of the embodiment 1, also in this embodiment, an effect of suppressing the "shuddering" and the "improper cleaning" can be obtained by supplying the fog toner to the cleaning portion B during the non-image formation.

Thus, in this embodiment, the controller 205 carries out control so as to execute the supplying operation in which the Vback larger than the Vback during the image forming operation is generated during the non-image forming operation before or after the image forming operation. In this embodiment, the controller 205 carries out control so that in the supplying operation, the Vback is changed to a first value larger than the Vback during the image forming operation and to a second value larger than the first value. At this time, in this embodiment, the controller 205 carries out control so that in the supplying operation, the Vback is made stepwise larger than the Vback during the image forming operation. Further, at this embodiment, the controller 205 is capable of changing the Vback stepwise by changing at least one of a change width per stage when the absolute value of the surface potential of the image bearing member 1 is changed stepwise and a change width per stage when the absolute value of the developing voltage is changed stepwise.

As described above, according to this embodiment, not only an effect similar to the effect of the embodiment 1 is obtained, but also the occurrence of the fog (fog during the image formation) on the non-image portion of the printed matter can be suppressed by reducing accumulation of the deteriorated toner in the neighborhood of the developing roller 42. Further, according to this embodiment, it is possible to suppress the occurrence of the development stripe.

Next, another embodiment (embodiment 3) of the present invention will be described. Basic constitution and operation of an image forming apparatus of this embodiment are the same as those of the image forming apparatus of the embodiment 1. Accordingly, in the image forming apparatus of this embodiment, as regards elements having the same or corresponding functions or constitutions as those of the image forming apparatus of the embodiment 1, detailed description will be omitted by adding thereto the same reference numerals or symbols as those in the embodiment 1.

1. Summary of this Embodiment

In this embodiment, the control of the embodiment 1 and the control of the embodiment 2 are properly used depending on an ambient environment (installation experiment) of the image forming apparatus 100. By this, the effect of the embodiment 1 and the effect of the embodiment 2 can be more effectively obtained.

In this embodiment, the image forming apparatus 100 carries out the control of the embodiment 1 in a low-temperature/low-humidity environment of, for example, 15° C./10% RH (first mode) and the control of the embodiment 2 in a high-temperature/high-humidity environment of, for example, 30° C./80% RH (second mode).

A first reason of this is such that an environment in which the improper cleaning is liable to occur is the low-temperature/low-humidity environment, and therefore, an ambient environment in which the effect of the embodiment 1 can be remarkably obtained is the low-temperature/low-humidity environment. In the low-temperature/low-humidity environment, the toner becomes easy to pass through the cleaning blade 101 because elasticity of the cleaning blade 101 is liable to lower and the toner is liable to become high in charge amount and mirror force with the photosensitive drum 1.

A second reason of this is such that an environment in which the fog during the image formation and the development stripe are liable to occur is the high-temperature/high-humidity environment, and therefore, an ambient environment in which the effect of the embodiment 2 can be remarkably obtained is the high-temperature/high-humidity environment. In the low-temperature/low-humidity environment, the toner becomes easy to soften, and therefore, the deterioration of the toner such as the transfer or the burying of the external additive of the toner or the deformation of the toner shape, or the like is liable to advance.

2. Control Constitution and Control Procedure

Figure 19:
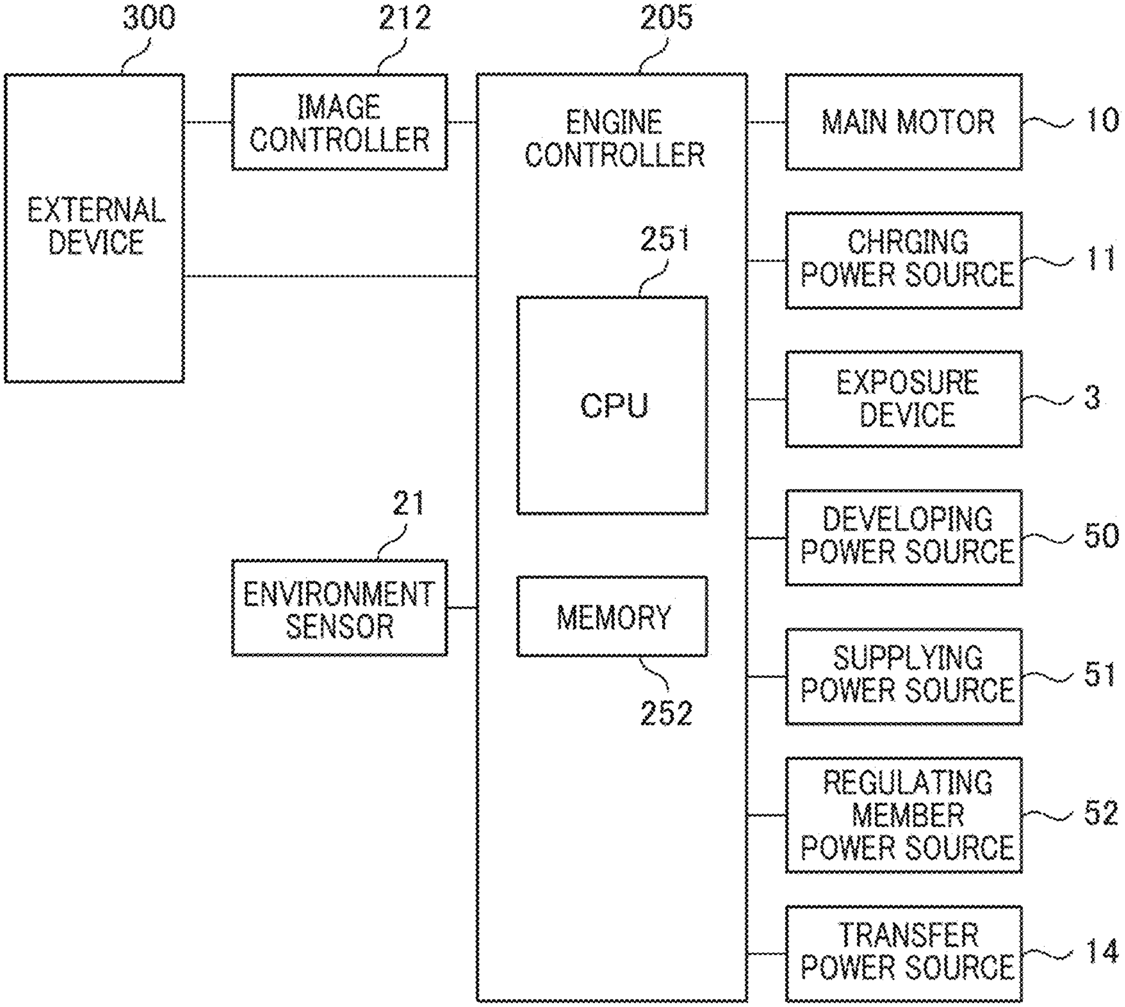
FIG. 19 is a block diagram showing a control constitution of an image forming apparatus of an embodiment 3.

FIG. 19 is a blocked diagram showing control constitution of the image forming apparatus 100 of this embodiment. The control constitution in this embodiment shown in FIG. 19 is similar to the control constitution in the embodiment 1 shown in FIG. 2, but in this embodiment, the image forming apparatus 100 further includes an environment sensor (temperature/humidity sensor) 21 which is an environment detecting portion as an environment detecting means. Incidentally, the environment may be at least one of the temperature and the humidity on at least one of an inside and an outside of the image forming apparatus 100. In this embodiment, the environment sensor 21 detects the temperature and the humidity (relative humidity) of the outside of the image forming apparatus 100 in the ambient environment. The environment sensor 21 outputs, to the engine controller 205, a signal indicating a detection result of the temperature and a detection result of the humidity. The engine controller 205 is capable of acquiring an absolute humidity (water content) ($g/m^3$) on the basis of the signal inputted from the environment sensor 21.

Figure 20:
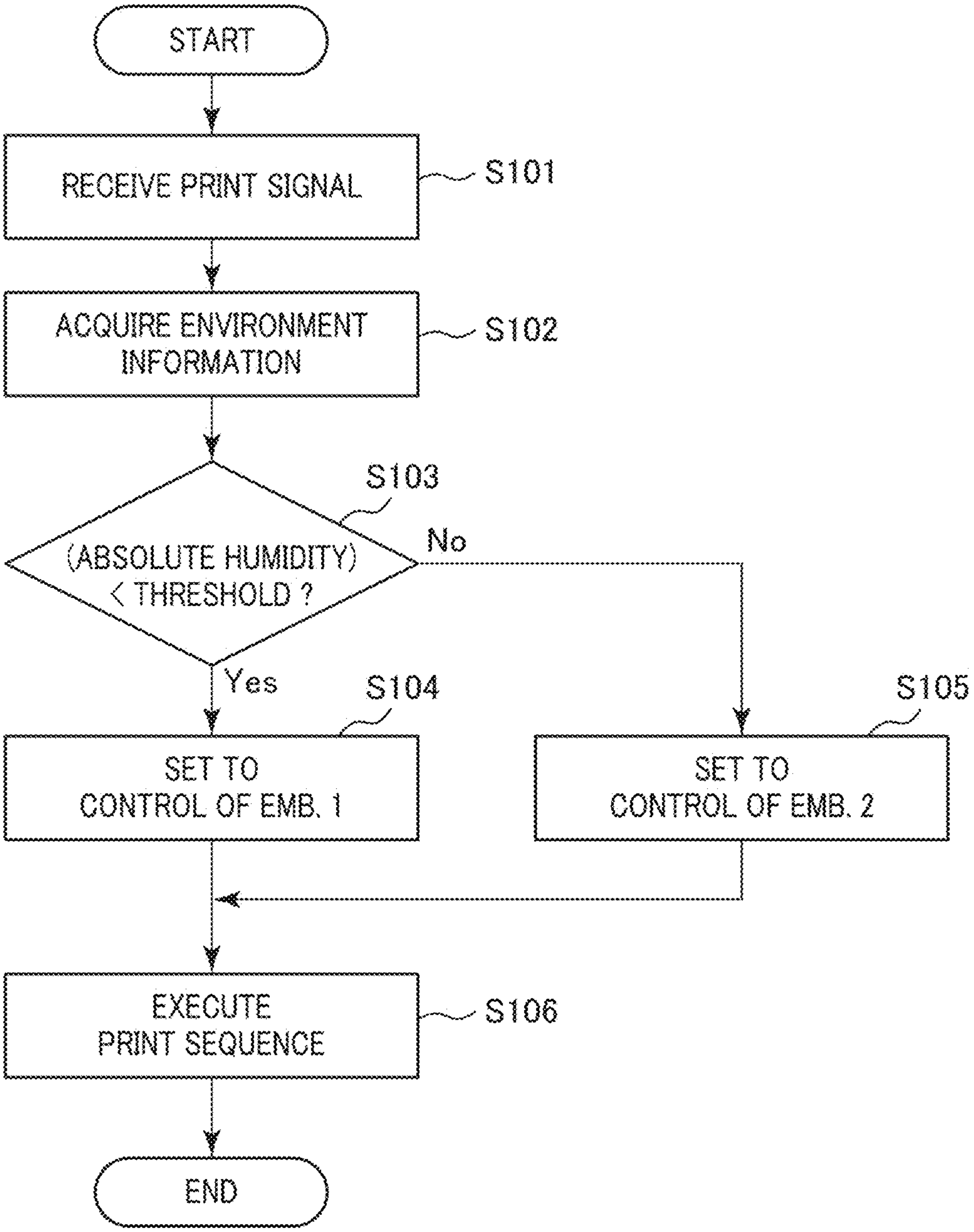
FIG. 20 is a flowchart showing an outline of a procedure of a print operation in the embodiment 3.

FIG. 20 is a flowchart showing an outline of a procedure of the print operation in this embodiment. When a print signal is inputted from the host computer 300 (S101), the engine controller 205 acquires temperature information and humidity information from the environment sensor 21, and acquires an absolute humidity (S102). Then, the engine controller 205 discriminates whether or not the absolute humidity is less than a predetermined threshold set in advance (S103). Incidentally, this threshold can be appropriately set so as to be capable of effectively obtain the effects of the embodiments 1 and 2 in view of the above-described first and second reasons, for example. In the case where the engine controller 205 discriminated in S103 that the absolute humidity is less than the threshold, the engine controller 205 determines that the print sequence is executed in the control of the embodiment 1 in which the Vback is made smaller than the Vback in the pre-rotation sequence and the post-rotation sequence (S104). On the other hand, in the case where the engine controller 205 discriminated in S103 that the absolute humidity is not less than the threshold (is the threshold or more), the engine controller 205 determines that the print sequence is executed in the control of the embodiment 2 in which the Vback is made larger than the Vback in the pre-rotation sequence and the post-rotation sequence (S105). Further, the engine controller 205 executes the print sequence by using the control determined in S104 or S105 (S106).

Incidentally, in this embodiment, with the predetermined threshold as a boundary, the control of the embodiment 1 is carried out in the low-temperature/low-humidity environment and the control of the embodiment 2 is carried out in the high-temperature/high-humidity environment, but the present invention is not limited thereto. For example, a first threshold for discriminating the low-temperature/low-humidity environment and a second threshold (corresponding to the high-temperature/high-humidity environment than the first threshold is) for discriminating the high-temperature/high-humidity environment may be different from each other. Further, in an environment between these first and second thresholds, control similar to the above-described control of the comparison example 1 in which the supplying operation is not performed may be carried out (see embodiment 4). Further, for example, in a predetermined low-temperature/low-humidity environment, the control of the embodiment 1 is executed, and in an environment other than this environment, the control similar to the above-described control of the comparison example 1 in which the supplying operation is not executed may be executed. Further, for example, in a predetermined high-temperature/high-humidity environment, the control of the embodiment 2 is executed, and in an environment other than this environment, the control similar to the above-described control of the comparison example 1 in which the supplying operation is not executed may be executed.

Thus, in this embodiment, the engine controller 205 carries out control so as to selectively execute the operation in the first mode which is the non-image forming operation, as the supplying operation, in which the Vback smaller than the Vback during the image forming operation is generated at a predetermined timing and the operation in the second mode which is the non-image forming operation, as the supplying operation, in which the Vback larger than the Vback during the image forming operation is generated at the predetermined timing. In this embodiment, the image forming apparatus 100 includes the environment detecting portion (environment sensor) 21 for detecting the environment, and the controller 205 carries out control so as to execute the operation in the first mode in the case where an environment indicated by a detection result of the environment detecting portion 21 is a first environment and the operation in the second mode in the case where the environment indicated by a detection result of the environment detecting portion 21 is a second environment higher in temperature and humidity than in the first environment.

As described above, according to this embodiment, the effect of the embodiment 1 and the effect of the embodiment 2 can be more effectively obtained.

Next, another embodiment (embodiment 4) of the present invention will be described. Basic constitution and operation of an image forming apparatus of this embodiment are the same as those of the image forming apparatus of the embodiment 1. Accordingly, in the image forming apparatus of this embodiment, as regards elements having the same or corresponding functions or constitutions as those of the image forming apparatus of the embodiment 1, detailed description will be omitted by adding thereto the same reference numerals or symbols as those in the embodiment 1.

1. Summary of this Embodiment

In this embodiment, the control of the embodiment 1, the control of the embodiment 2, and the control of the comparison example 1 are properly used depending on an ambient environment (installation experiment) of the image forming apparatus 100. By this, the effect of the embodiment 1 and the effect of the embodiment 2 can be more effectively obtained while inducing toner consumption. Incidentally, the control of the comparison example 1 is as described in the embodiment 1.

In this embodiment, for example, in the low-temperature/low-humidity environment of 15° C./10% RH, the image forming apparatus 100 carries out the control of the embodiment 1 in the case where the developing device 4 is in a use (operation) state of less than 50% with respect to a lifetime (which is 100% in a new state and which is 0% in a lifetime arrival state in which the developing device 4 is unusable) (first mode), and carries out the control of the comparison example 1 in the case where the developing device 4 is in a use state of 50% or more with respect to the lifetime thereof (third mode).

Further, for example, in the high-temperature/high-humidity environment of 30° C./80% RH, the image forming apparatus 100 carries out the control of the comparison example 1 in the case of a use state of less than 50% with respect to the lifetime of the developing device 3 (third mode), and carries out the control of the embodiment 2 in the case of a use state of 50% or more with respect to the lifetime of the developing device 4 (second mode). Further, for example, in a normal-temperature/normal-humidity environment of 23° C./50% RH, the image forming apparatus 100 carries out the control of the comparison example 1 irrespective of the use state of the developing device 4.

This is for the following reason. In the control of the comparison example 1, the supplying operation is not performed, and therefore, there is an advantage such that the number of printed sheets can be increased in the case where the developing device 4 in which a volume of the toner is the same is used. Therefore, the supplying operation is performed only in a situation in which the effect of the embodiment 1 and the effect of the embodiment 2 can be more effectively obtained.

The situation in which the effect of the embodiment 1 can be more effectively obtained is the first half of the lifetime of the developing device 4 is addition to that an environment in which the improper cleaning is liable to occur is the low-temperature/low-humidity environment. This is because in the low-temperature/low-humidity environment, conditions in which the toner becomes easy to pass through the cleaning blade 101 are combined as a result that in the low-temperature/low-humidity environment, elasticity of the cleaning blade 101 is liable to lower and in the first half of the lifetime of the developing device 4, the toner is liable to become high in charge amount and mirror force with the photosensitive drum 1.

The situation in which the effect of the embodiment 2 can be more effectively obtained is the second half of the lifetime of the developing device 4 in addition to that an environment in which the fog during the image formation and the development stripe are liable to occur is the high-temperature/high-humidity environment. This is because in the high-temperature/high-humidity environment, conditions in which the toner becomes easy to soften and in the second half of the lifetime of the developing device 4, the transfer or the burying of the external additive of the toner or the deformation of the toner shape, or the like is liable to advance, and thus the fog during the image formation and the development stripe are liable to occur are combined.

Further, in a situation other than the above-described two situations (under the low-temperature/low-humidity environment and in the first half of the lifetime of the developing device 4, and under the high-temperature/high-humidity environment and in the second half of the lifetime of the developing device 4), the supplying operation is not performed by using the control of the comparison example 1, whereby suppression of the toner consumption is prioritized.

2. Control Constitution and Control Procedure

Figure 21:
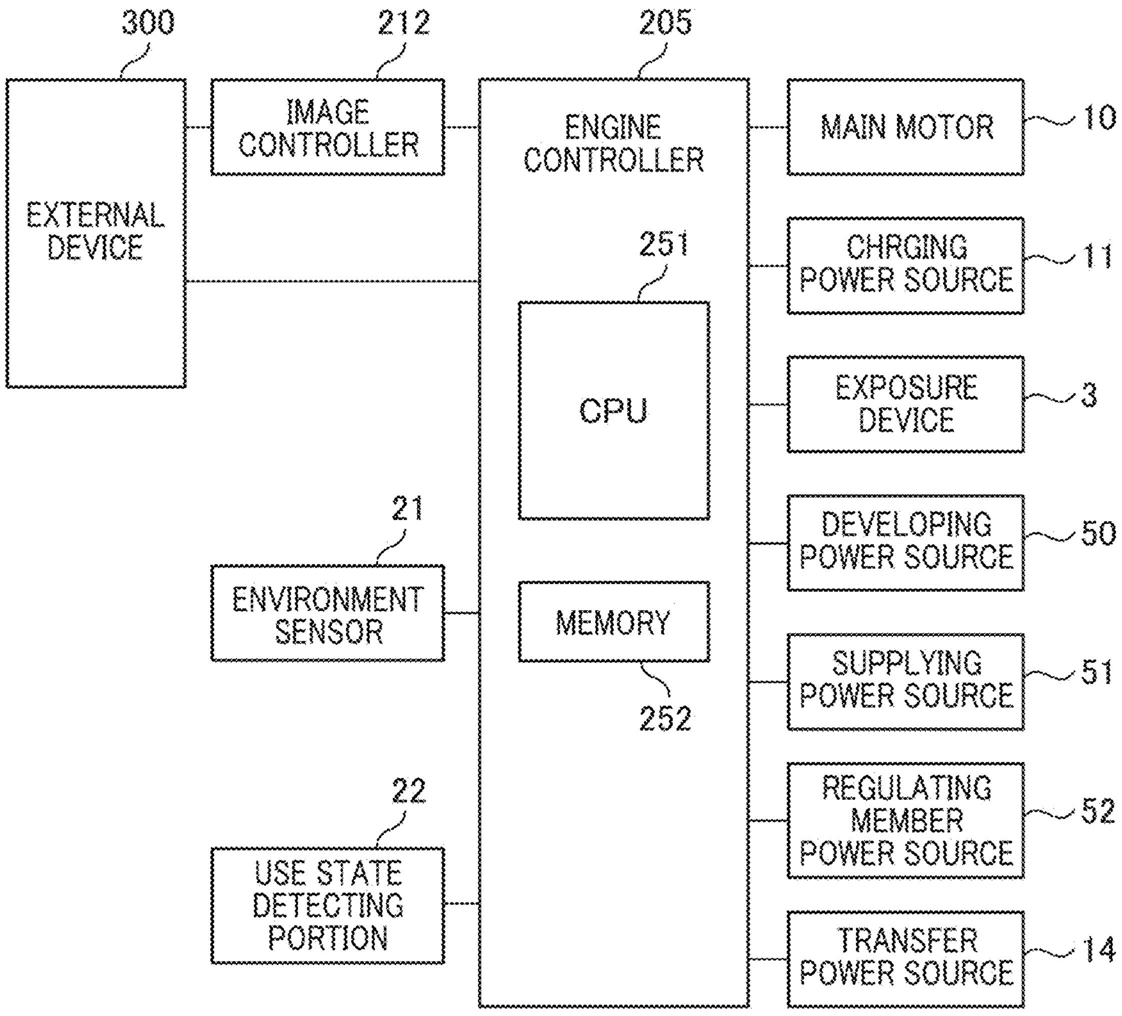
FIG. 21 is a block diagram showing a control constitution of an image forming apparatus of an embodiment 4.

FIG. 21 is a blocked diagram showing control constitution of the image forming apparatus 100 of this embodiment. The control constitution in this embodiment shown in FIG. 21 is similar to the control constitution in the embodiment 3 shown in FIG. 19, but in this embodiment, the image forming apparatus 100 further includes a use state detecting portion 22 as a use state detecting means for detecting a use state of the developing device 4. As the use state detecting portion 22, for example, it is possible to appropriately select a use state detecting portion from well-known use state detecting portions. For example, use state detecting portions based on a consumption amount or an index value of a remaining amount of the toner, an index value (a cumulative value of the number of times of rotation or a rotation time, or the like), and both of these values, and the like have been known. Further, as a type in which the consumption amount or the remaining amount of the toner is detected, for example, types based on image information (pixel count, polarity ratio, or the like) in the image formation carried out by using the developing device 4, a detection result of electrostatic capacity between electrodes changed depending on the amount of the toner in the developing device 4, and a detection result of a light transmission amount (light amount, light transmission time, or the like) changed depending on the amount of the toner in the developing device 4 have been known. The use state detecting portion 22 outputs, to the engine controller 205, a signal indicating an index value (index value of a use amount of the developing roller 42, index value of the toner consumption amount or the toner remaining amount, or the like) relating to the use state of the developing device 4. The engine controller 205 is capable of acquiring the use state of the developing device 4 on the basis of the signal inputted from the use state detecting portion 22. For example, by using the acquired index value and a predetermined threshold (which may be a plurality of thresholds), it is possible to acquire the use state (what % of the lifetime) of the developing device 4.

Figure 22:
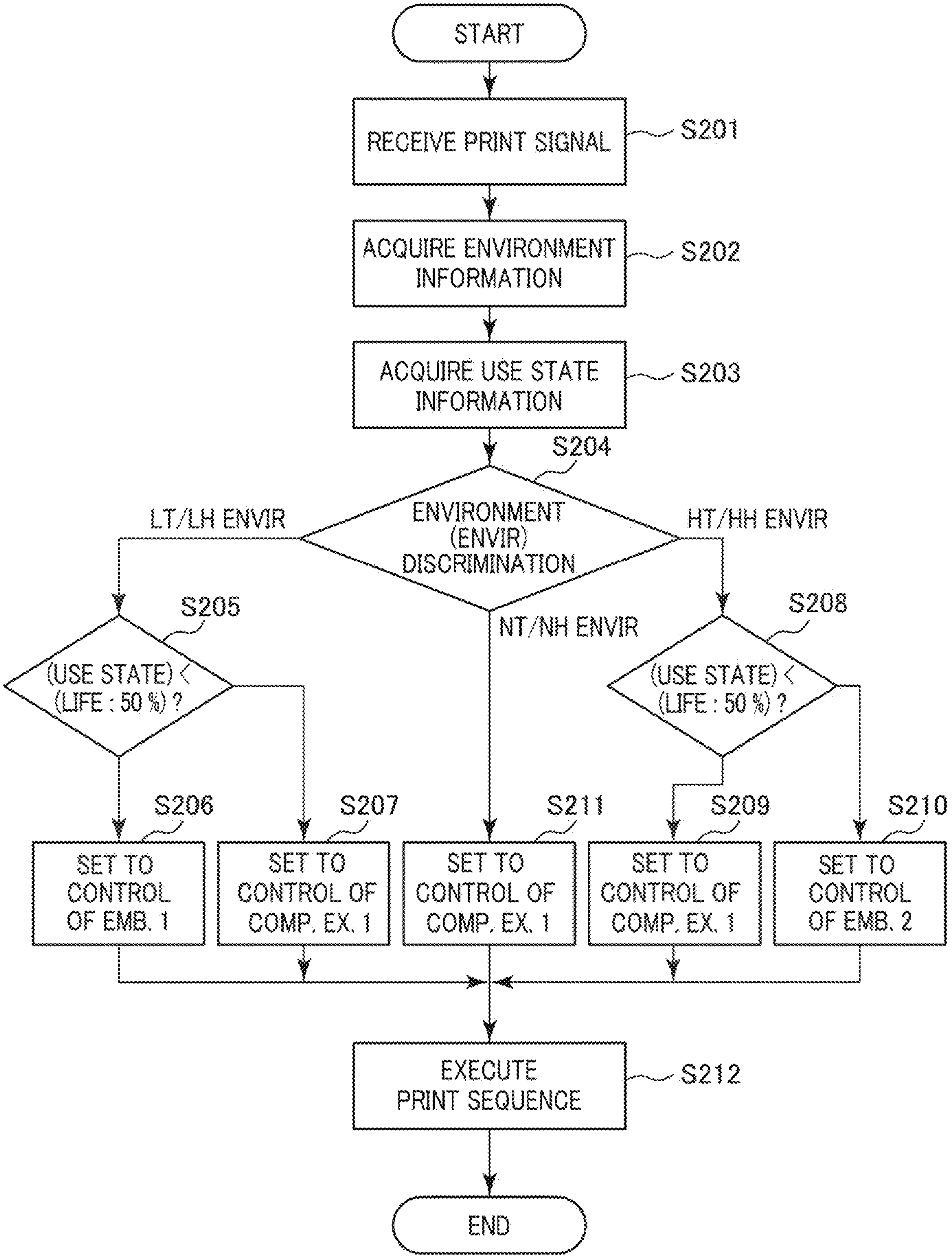
FIG. 22 is a flowchart showing an outline of a procedure of a print operation in the embodiment 4.

FIG. 22 is a flowchart showing an outline of a procedure of the print operation in this embodiment. When a print signal is inputted from the host computer 300 (S201), the engine controller 205 acquires temperature information and humidity information from the environment sensor 21, and acquires an absolute humidity (S202). Further, the engine controller 205 acquires the information on the index value relating to the use state of the developing device 4 from the use state detecting portion 22 and thus acquires the use state (what % of the lifetime) of the developing device 4 (S203). Then, on the basis of an absolute humidity and a predetermined threshold, set in advance, for discriminating the low-temperature/low-humidity environment, the normal-temperature/normal-humidity environment, and the high-temperature/high-humidity environment, the engine controller 205 discriminates whether the environment is which one of these environments (S204). Incidentally, this threshold can be appropriately set in view of the effects of control of the embodiments 1 and 2 and the effect of suppressing the toner consumption amount in the above-described two situations, for example.

In the case where the engine controller 205 discriminated in S204 that the environment is the low-temperature/low-humidity environment, the engine controller 205 discriminates whether or not the use state of the developing device 4 is less than 50% of the lifetime of the developing device 4 (S205). In the case where the engine controller 205 discriminated in S205 that the absolute humidity is less than 50%, the engine controller 205 determines that the print sequence is executed in the control of the embodiment 1 in which the Vback is made smaller than the Vback in the pre-rotation sequence and the post-rotation sequence (S206). On the other hand, in the case where the engine controller 205 discriminated that the environment is not less than 50% (50% or more), the engine controller 205 determines that the print sequence is executed in the control of the comparison example 1 in which the supplying operation is not performed (S207).

Further, in the case where the engine controller 205 discriminated in S204 that the environment is the high-temperature/high-humidity environment, the engine controller 205 discriminates whether or not the use state of the developing device 4 is less than 50% of the lifetime of the developing device 4 (S208). In the case where the engine controller 205 discriminated in S208 that the use state is less than 50%, the engine controller 205 determines that the print sequence is executed in the control of the comparison example 1 in which the supplying operation is not performed (S209). On the other hand, in the case where the engine controller 205 discriminated in S208 that the absolute humidity is not less than 50% (is 50% or more), the engine controller 205 determines that the print sequence is executed in the control of the embodiment 2 in which the Vback is made larger than the Vback in the pre-rotation sequence and the post-rotation sequence (S210).

Further, in the case where the engine controller 205 discriminated in S204 that the environment is the normal temperature/normal humidity environment, the engine controller 205 determines that the print sequence is executed in the control of the comparison example 1 in which the supplying operation is not performed (S211). Further, the engine controller 205 executes the print sequence by using the control determined in S206 or S207, S208, S209, S210 and S211 (S212).

Incidentally, in this embodiment, the control of the first embodiment was executed in the low-temperature/low-humidity environment and in the first half of the lifetime of the developing device 4, the control of the second embodiment was executed in the high-temperature/high-humidity environment and in the second half of the lifetime of the developing device 4, and the control of the comparison example 1 in which the supplying operation was not performed was executed in the situations other than the above-described two situations, but the present invention is not limited thereto. For example, the control of the embodiment 1 is executed in the low-temperature/low-humidity environment and in the first half of the lifetime of the developing device 4, and control similar to the control of the comparison example 1 in which the supplying operation is not performed may be executed in the situations other than this situation. Further, for example, the control of the embodiment 2 is executed in the high-temperature/high-humidity environment and in the second half of the lifetime of the developing device 4, and control similar to the control of the comparison example 1 in which the supplying operation is not performed may be executed in the situations other than this situation. Further, for example, with the predetermined threshold as a boundary, whether the use state of the developing device 4 is the first half of the lifetime of the developing device 4 or the second half of the lifetime of the developing device 4 is discriminated, but the present invention is not limited thereto. For example, a first threshold for discriminating a state in which a use amount of the developing device 4 is small and a second threshold (corresponding to a state in which the use amount is larger than the first threshold) for discriminating a state in which the use amount of the developing device 4 is large may be different from each other. Further, in an environment between these first and second thresholds, control similar to the above-described control of the comparison example 1 in which the supplying operation is not performed may be carried out.

Thus, in this embodiment, the engine controller 205 carries out control so as to selectively execute the operation in the first mode which is the non-image forming operation, as the supplying operation, in which the Vback smaller than the Vback during the image forming operation is generated at a predetermined timing and the operation in the second mode which is the non-image forming operation, as the supplying operation, in which the Vback larger than the Vback during the image forming operation is generated at the predetermined timing, and the operation in the third mode which is the non-image forming operation in which the supplying operation is not performed. In this embodiment, the image forming apparatus 100 includes the environment detecting portion (environment sensor) 21 for detecting the environment these use state detecting portion 22 for detecting the use state of the developing member 42. The controller 205 carries out control so as to execute the operation in the first mode in the case where an environment indicated by a detection result of the environment detecting portion 21 is a first environment and the use amount of the developing member 42 indicated by a detection result of the use state detecting portion 22 is a first use amount, the operation in the second mode in the case where the environment indicated by a detection result of the environment detecting portion 21 is a second environment higher in temperature and humidity than in the first environment and the use amount of the developing member 42 indicated by a detection result of the use state detecting portion 22 is a second use amount larger than the first use amount, and the operation in the third mode in the case where the environment indicated by the environment detecting portion 21 is a third environment higher in temperature and humidity than the first embodiment and lower in temperature and humidity than the second environment. Further, in this embodiment, the controller 205 carries out control so that the Vback is made substantially constant at substantially the same value as the value during the image forming operation in the operation in the third mode.

As described above, according to this embodiment, the effect of the embodiment 1 and the effect of the embodiment 2 can be more effectively obtained while reducing the toner consumption.

In the above, the present invention was described in accordance with the specific embodiments, but the present invention is not limited to the above-described embodiments.

In the above-described embodiments, the case where the present invention was applied to the monochromatic image forming apparatus was described, but the present invention can be applied to a color image forming apparatus, so that effects similar to those of the above-described embodiments can be obtained. For example, there is a tandem-type color image forming apparatus in which a plurality of image forming portions each provided with a photosensitive member and in which a toner image is formed at each of the image forming portions supply as in the above-described embodiments. As the tandem-type color image forming apparatus, for example, there is a color image forming apparatus of a direct transfer type in which toner images formed on a plurality of photosensitive members are successively transferred onto a recording material carried on a recording material carrying member such as a recording material conveying belt. Further, as the tandem-type color image forming apparatus, for example, there is a color image forming apparatus of an intermediary transfer type in which the toner images formed on the plurality of photosensitive members are primary-transferred onto an intermediary transfer member such as an intermediary transfer belt and then are secondary-transferred onto the recording material.

Figure 23:
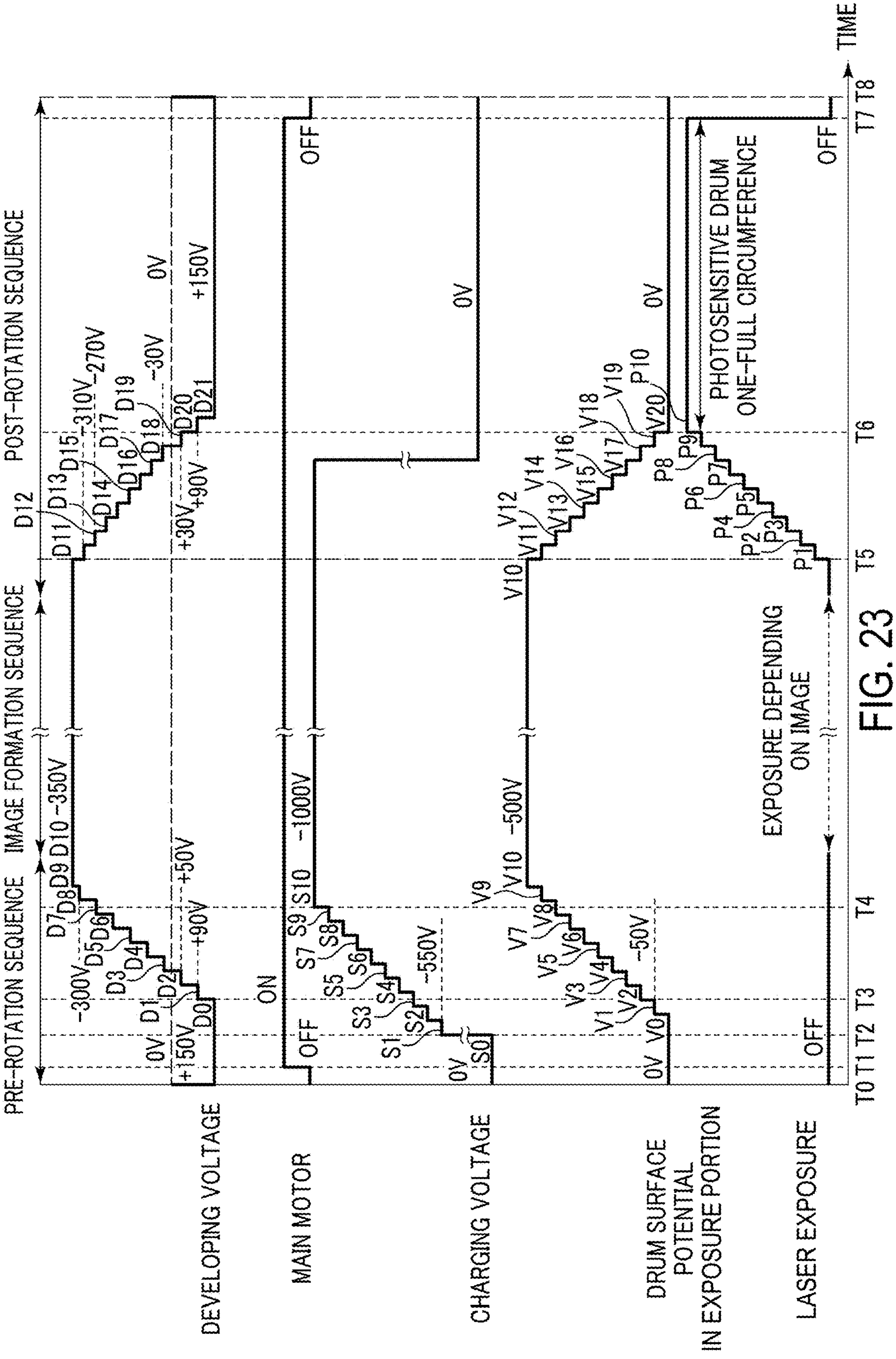
FIG. 23 is a timing chart of a print sequence in another embodiment.

Further, in the above-described embodiments, the method in which the laser exposure is made after the charging voltage is made 0V at the timing T5 when the image forming sequence is switched to the post-rotation sequence was described (FIGS. 5 and 14). However, even when the charging voltage is −500 V until the timing T6 and is changed to 0V at the timing T6, the third potentials V11 to V20 can be formed by the laser exposure similar to the laser exposure in the above-described embodiments. Accordingly, when the cleaning voltage is switched to 0V at an arbitrary timing from the timing T5 to the timing T6, effects similar to those of the above-described embodiments can be obtained. An example of a timing chart of a print sequence in this case is shown in FIG. 23.

Further, switching of the developing voltage and the surface potential of the photosensitive drum in the pre-rotation sequence and the post-rotation sequence was made in the following manner. That is, a stepwise switching width of the surface potential of the photosensitive drum is made constant and a stepwise switching width of the developing voltage is changed, so that the Vback is made smaller than (embodiment 1) or larger than (embodiment 2) the Vback during the image formation. However, the present invention is not limited to such embodiments. For example, the stepwise switching width of the developing device is made constant and the stepwise switching width of the surface potential of the photosensitive drum is changed, so that a similar effect can be obtained even when the Vback is made smaller or larger than the Vback during the image formation. An example of the developing voltage and the surface potential of the photosensitive drum in each of stages (steps) in this case is shown as a modified embodiment for each of the embodiments 1 and 2 in FIG. 24. Incidentally, both the stepwise switching width of the developing voltage and the stepwise switching width of the surface potential of the photosensitive drum may be changed. Further, the number of stages of stepwise switching of each of the developing voltage and the surface potential of the photosensitive drum may be different from those of the above-described embodiments. Further, the developing voltage and the surface potential of the photosensitive drum may be changed linearly or curvedly, not stepwise. In the case where the developing voltage and the surface potential of the photosensitive drum is changed linearly or curvedly, the Vback is also changed linearly or curvedly. When a period in which the Vback is made smaller or larger during the non-image formation than the Vback during the image formation can be provided, effects similar to those of the above-described embodiments. However, the case where the developing voltage and the surface potential of the photosensitive drum are switched stepwise as described above is preferable because a desired Vback can be stably formed in the case where a rising speed or a falling speed is different between the high-voltage power source for outputting the developing voltage and the high-voltage power source for outputting the charging voltage.

Further, in the embodiment 1, after the Vback was made gradually small from the Vback during the image formation in the pre-rotation sequence or the post-rotation sequence, the Vback was made gradually large to the Vback during the image formation. However, the Vback is not necessarily made gradually large to the Vback during the image formation, but may be made large at once. Further, in the embodiment 2, after the Vback was made gradually large from the Vback during the image formation in the pre-rotation sequence or the post-rotation sequence, the Vback was made gradually small to the Vback during the image formation. However, the Vback is not necessarily made gradually small to the Vback during the image formation, but may be made small at once.

Figure 25:
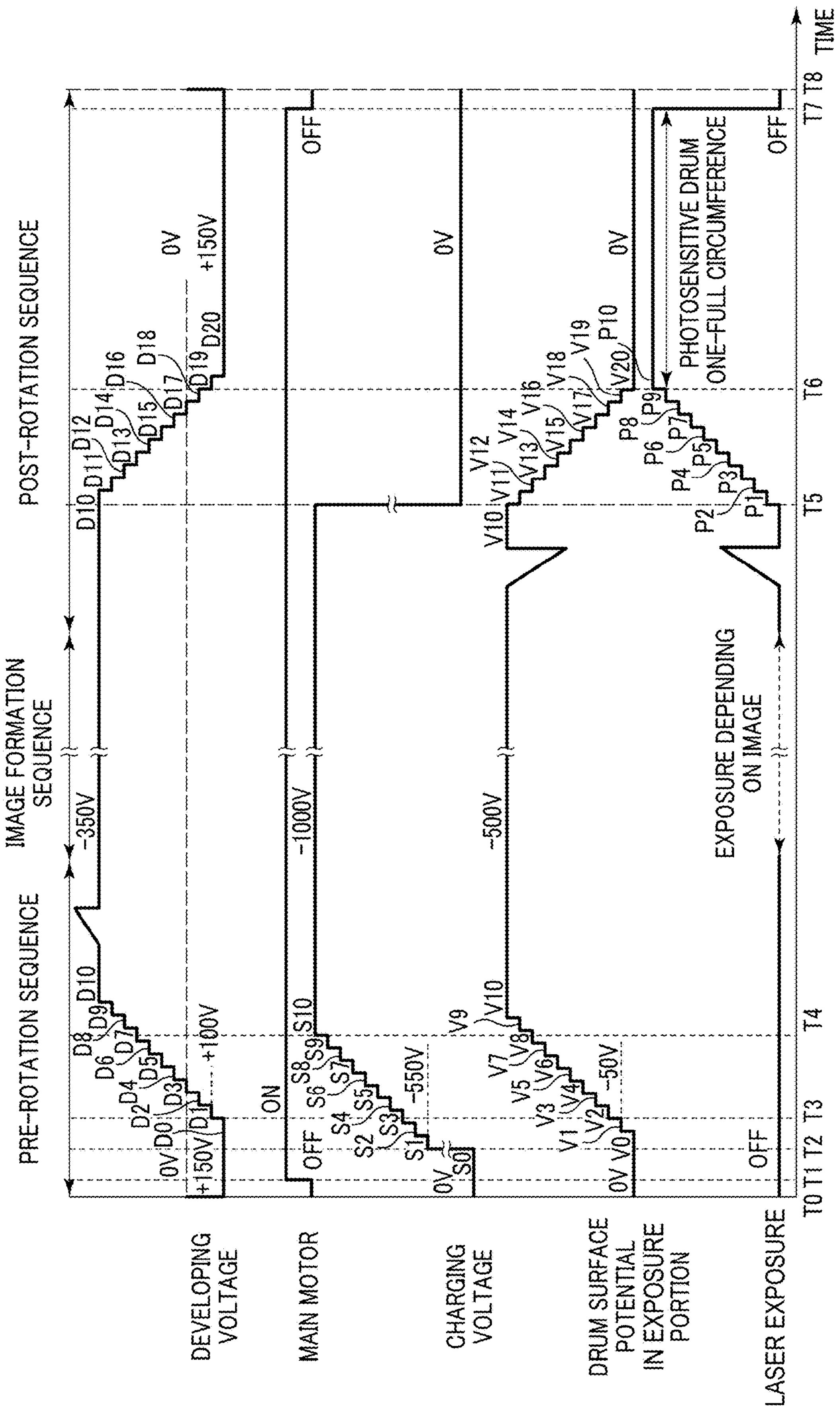
FIG. 25 is a timing chart of a print sequence in another embodiment.

Further, in the embodiment 1, the Vback was made smaller than the Vback during the image formation by changing the stepwise switching width of the developing voltage in the pre-rotation sequence and the post-rotation sequence, but the present invention is not limited to such an embodiment. For example, as shown in FIG. 25, the period in which the Vback is made smaller than the Vback during the image formation may be provided after the stepwise rising control of the developing voltage and the surface potential of the photosensitive drum and before the start of the image forming sequence or after the end of the image forming sequence and before the stepwise falling control of the developing voltage and the surface potential of the photosensitive drum. For example, as shown in FIG. 25, the period in which the Vback is made smaller than the Vback during the image formation can be provided by changing only the developing voltage without changing the charging voltage or by changing only the surface potential of the photosensitive drum by subjecting the photosensitive drum surface to the exposure by the exposure device without changing the developing voltage. However, in the case where such control is carried out, for example, in a method in which the developing voltage is changed, a voltage different from the voltage used during the image formation, so that a developing voltage with a wider output range is needed. For that reason, the method described in the embodiment 1 has an advantage such that the present invention is applicable to this method within a limited output range of the developing voltage.

Figure 26:
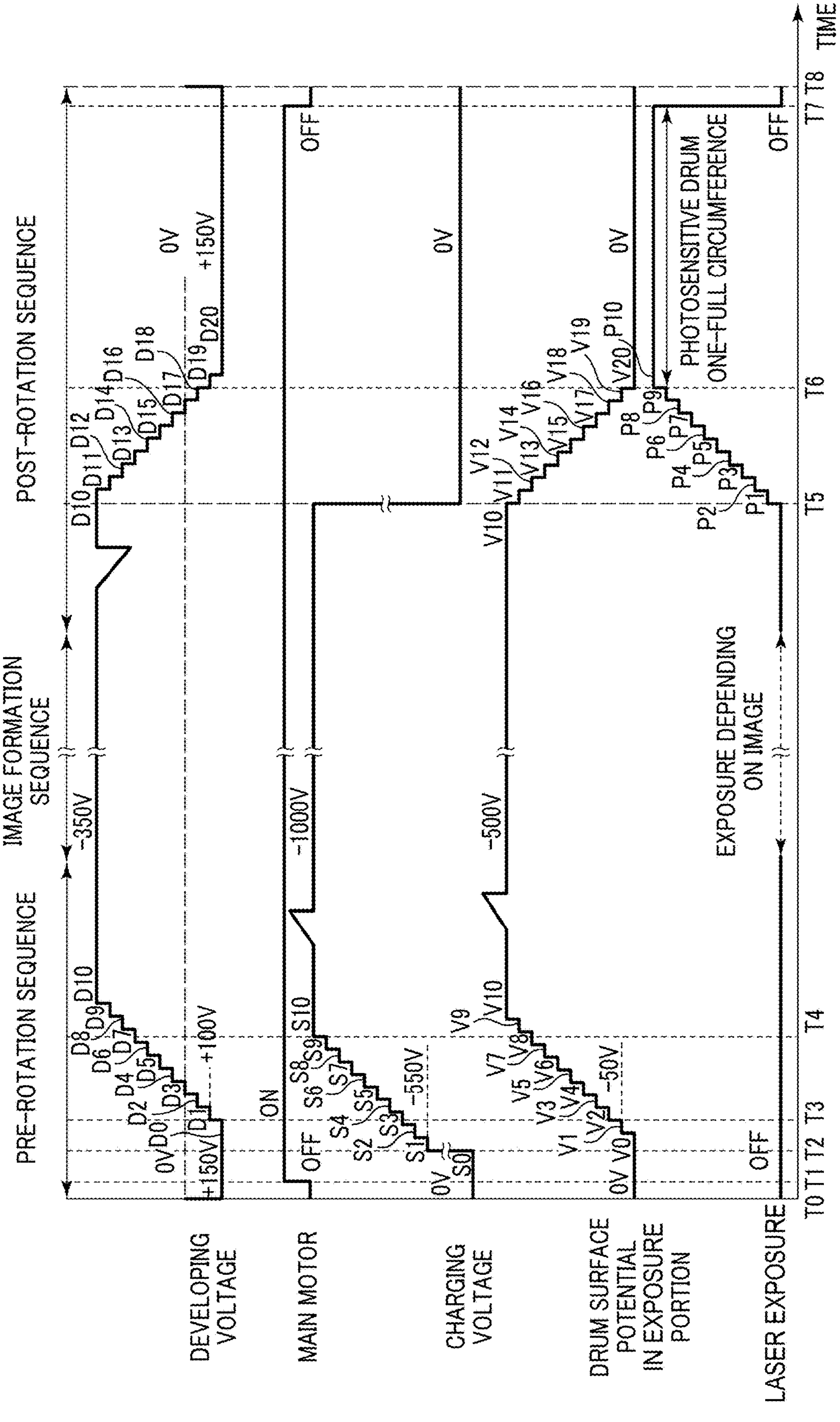
FIG. 26 is a timing chart of a print sequence in another embodiment.

Further, in the embodiment 2, the Vback was made larger that the Vback during the image formation by changing the stepwise switching width of the developing voltage in the pre-rotation sequence and the post-rotation sequence, but the present invention is not limited to such an embodiment. For example, as shown in FIG. 26, the period in which the Vback is made larger than the Vback during the image formation may be provided after the stepwise rising control of the developing voltage and the surface potential of the photosensitive drum and before the start of the image forming sequence, or after the image forming sequence and before the stepwise falling control of the developing voltage and the surface potential of e photosensitive drum. For example, as shown in FIG. 26, the period in which the Vback is made larger than the Vback during the image formation can be provided by changing only the charging voltage without changing the developing voltage or by changing only the developing voltage without changing the charging voltage and without performing the exposure by the exposure device. However, in the case where such control is executed, for example, in a method in which the charging voltage is changed, a voltage different from the voltage used during the image formation is used, so that a charging voltage with a wider output range is needed. For that reason, the method described in the embodiment 2 has an advantage such that the present invention is applicable to this method within a limited output range of the charging voltage.

Further, in the above-described embodiments, in both the pre-rotation sequence and the post-rotation sequence, the control ("supplying operation") in which the Vback is made smaller (embodiment 1) or larger (embodiment 2) than the Vback during the image formation was executed, but the present invention is not limited to this supplying operation. This supplying operation can be executed when the execution time is the time of the non-image formation, and for example, may be executed only in either one of the pre-rotation sequence and the post-rotation sequence.

Further, for example, in one of the pre-rotation sequence and the post-rotation sequence, the control of the embodiment 1 in which the Vback is made smaller than the Vback during the image formation is executed, and in the other one rotation sequence, the control of the embodiment 2 in which the Vback is made larger than the Vback during the image formation is executed.

Further, in the above-described embodiments, the print sequence was described by taking, as an example, the case where the print signal is inputted to the image forming apparatus in a state in which the image forming apparatus is in a stand-by state (waiting state) in which the image forming apparatus waits for the print signal after the power source of the image forming apparatus is turned on (power ON). When the power source is turned on (power ON), the image forming apparatus may be constituted to separately execute a pre-multi-rotation sequence (pre-multi-rotation operation) which is an operation during actuation. In the pre-multi-rotation sequence, for example, control in which appropriate voltage setting of the charging, the development, and the transfer is determined depending on a state of the process cartridge is executed. When a predetermined pre-multi-rotation sequence is ended, outputs of the main motor and the various power sources are stopped, and the image forming apparatus is kept at the stand-by state until the print signal is inputted. In the pre-multi-rotation sequence, when the charging voltage and the developing voltage are raised, a supplying operation similar to those in the above-described embodiments may be executed.

Further, in the above-described embodiments, the image forming apparatus was not provided with a development contact and separation mechanism for moving the developing roller toward and away from the photosensitive drum, but the present invention is not limited to application to the image forming apparatus having such a constitution. Even when the image forming apparatus is provided with the development contact and separation mechanism, for example, in the case where a start and a stop of rotation of the photosensitive drum are made in a state in which the developing roller contacts the photosensitive drum, or in the like case, control similar to those of the above-described embodiments is carried out, so that a similar effect can be obtained.

Further, in the above-described embodiments, the non-image portion potential was formed on the photosensitive drum only by the charging, but may also be formed on the photosensitive drum by executing exposure with an exposure amount smaller than the exposure amount for the image portion (weak exposure) after the charging process is executed.

Further, the image bearing member is not limited to a drum-shaped image bearing member, but may also be an endless belt-shaped image bearing member.

Further, as regards the Vback, when the Vback falls within a predetermined range, the amount of the fog toner can be made sufficiently small in some instances. For example, when the Vback falls within a range of about ±50 V with respect to a value at which the amount of the fog toner becomes minimum, the amount of the fog toner can be made sufficiently small in some instances. A state in which the Vback is made substantially constant at a value which is substantially same as the Vback during the image formation includes the case where there is an error within such a range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-079731 filed on May 12, 2023, which is hereby incorporated by reference herein in its entirety.

What is claimed is:

1. An image forming apparatus comprising:
- a rotatable image bearing member;
- a charging member configured to electrically charge a surface of the image bearing member;
- a charging voltage applying portion configured to apply a charging voltage to the charging member;
- an exposure unit configured to form an electrostatic latent image on the surface of the image bearing member by exposing, to light, the surface of the image bearing member charged by the charging member;
- a developing member rotatable while carrying toner, forming a developing portion in contact with the surface of the image bearing member and configured to form a toner image on the surface of the image bearing member by supplying the toner to the electrostatic latent image on the surface of the image bearing member at the developing portion;
- a developing voltage applying portion configured to apply a developing voltage to the developing member;
- a cleaning member forming a cleaning portion in contact with the surface of the image bearing member and configured to remove the toner from the surface of the image bearing member;
- an environment detecting portion configured to detect an environment; and
- a controller configured to control at least one of the charging voltage applying portion, the developing voltage applying portion, and the exposure unit so as to generate a Vback which is a potential difference between a surface potential of the image bearing member charged by the charging member and the developing voltage applied to the developing member at the developing portion and which is the potential difference such that the surface potential is higher than the developing voltage on a side where a polarity thereof is the same as a normal charge polarity of the toner,
- wherein the controller carries out control so as to execute an image forming operation for forming the toner image on the surface of the image bearing member and a non-image forming operation for not forming the toner image on the surface of the image bearing member,
- wherein during the non-image forming operation from a start of rotation of the image bearing member to a start of the image forming operation or the non-image forming operation from an end of the image forming operation to a stop of the rotation of the image bearing member,
- in a state in which the developing member rotates in contact with the image bearing member,
- the controller carries out control so as to execute a supplying operation in which a Vback lower or higher than the Vback during the image forming operation is generated in a time corresponding to one full rotation of the developing member and the toner moved from the developing member to the surface of the image bearing member is supplied to the cleaning portion,
- wherein the controller carries out control so as to selectively execute:
  - the non-image forming operation in a first mode in which, as the supplying operation, the Vback lower than the Vback during the image forming operation is generated at a predetermined timing, and
  - the non-image forming operation in a second mode in which, as the supplying operation, the Vback higher than the Vback during the image forming operation is generated at the predetermined timing, and
- wherein the controller carries out control so as to execute:
  - the first mode in a case that the environment indicated by a detection result of the environment detecting portion is a first environment, and
- the second mode in a case that the environment indicated by a detection result of the environment detecting portion is a second environment higher in temperature and humidity than the first environment.

2. The image forming apparatus according to claim 1, wherein during the non-image forming operation from the start of rotation of the image bearing member to the start of the image forming operation,
- i) the controller changes an absolute value of the surface potential of the image bearing member from a value during the stop of the rotation of the image bearing member to a value during image formation, and
- ii) in at least a part of a period when an absolute value of the developing voltage is changed from a value during the stop of the rotation of the image bearing member to a value during the image forming operation, as the supplying operation, the controller changes the Vback to a first value lower than the Vback during the image forming operation and to a second value lower than the first value, or
- iii) the controller changes the Vback to a first value higher than the Vback during the image forming operation and to a second value higher than the first value.

3. The image forming apparatus according to claim 2, wherein during the non-image forming operation from the start of rotation of the image bearing member to the start of the image forming operation,
- iv) the controller changes stepwise the absolute value of the surface potential of the image bearing member, and in at least a part of a period when the absolute value of the developing voltage is changed stepwise, as the supplying operation,
- v) the controller makes the Vback stepwise lower than the Vback during the image forming operation, or
- vi) the controller makes the Vback stepwise higher than the Vback during the image forming operation.

4. The image forming apparatus according to claim 3, wherein the controller carries out control so as to stepwise change the Vback by changing at least one of a change width per stage when the absolute value of the surface potential of the image bearing member is changed stepwise and a change width per stage when the absolute value of the developing voltage is changed stepwise.

5. The image forming apparatus according to claim 1, wherein during the non-image forming operation from the end of the image forming operation to the stop of rotation of the image bearing member, i) the controller changes an absolute value of the surface potential of the image bearing member from a value during image formation to a value during the stop of the rotation of the image bearing member, and ii) in at least a part of a period when an absolute value of the developing voltage is changed from a value during the image forming operation to a value during the stop of the rotation of the image bearing member, as the supplying operation, the controller changes the Vback to a first value lower than the Vback during the image forming operation and to a second value lower than the first value, or iii) the controller changes the Vback to a first value higher than the Vback during the image forming operation and to a second value higher than the first value.

6. The image forming apparatus according to claim 5, wherein during the non-image forming operation from the end of the image forming operation to the stop of rotation of the image bearing member, iv) the controller changes stepwise the absolute value of the surface potential of the image bearing member, and v) in at least a part of a period when the absolute value of the developing voltage is changed stepwise, as the supplying operation, the controller makes the Vback stepwise lower than the Vback during the image forming operation, or vi) the controller makes the Vback stepwise higher than the Vback during the image forming operation.

7. The image forming apparatus according to claim 6, wherein the controller carries out control so as to stepwise change the Vback by changing at least one of a change width per stage when the absolute value of the surface potential of the image bearing member is changed stepwise and a change width per stage when the absolute value of the developing voltage is changed stepwise.

8. The image forming apparatus according to claim 1, wherein the controller carries out control so as to selectively execute:

the non-image forming operation in the first mode, the non-image forming operation in the second mode, and the non-image forming operation in a third mode in which the supplying operation is not executed.

9. The image forming apparatus according to claim 8, further comprising:

a use state detecting portion configured to detect a use state of the developing member, wherein the controller carries out control so as to execute;

the non-image forming operation in the first mode in a case that the environment indicated by a detection result of the environment detecting portion is the first environment and a use amount of the developing member indicated by a detection result of the use state detecting portion is a first use amount, the non-image forming operation in the second mode in a case that the environment indicated by a detection result of the environment detecting portion is the second environment higher in temperature and humidity than the first environment and a use amount of the developing member indicated by a detection result of the use state detecting portion is a second use amount greater than the first use amount, and the non-image forming operation in the third mode in a case that the environment indicated by a detection result of the environment detecting portion is a third environment higher in temperature and humidity than the first environment and lower in temperature and humidity than the second environment.

* * * * *